United States Patent
Cheng et al.

(10) Patent No.: US 8,225,315 B1
(45) Date of Patent: Jul. 17, 2012

(54) VIRTUAL CORE MANAGEMENT

(75) Inventors: Yu Qing Cheng, San Jose, CA (US); John Gregory Favor, Santa Clara, CA (US); Peter N. Glaskowsky, Santa Clara, CA (US); Laurent R. Moll, San Jose, CA (US); Carlos Puchol, Sunnyvale, CA (US); Joseph Rowlands, Santa Clara, CA (US); Seungyoon Peter Song, Santa Clara, CA (US)

(73) Assignees: Oracle America, Inc., Redwood Shores, CA (US); Sun Microsystems Technology Ltd., Hamilton (BM)

( * ) Notice: Subject to any disclaimer, the term of this patent is extended or adjusted under 35 U.S.C. 154(b) by 1294 days.

(21) Appl. No.: 11/933,319

(22) Filed: Oct. 31, 2007

Related U.S. Application Data

(62) Division of application No. 11/781,726, filed on Jul. 23, 2007, now Pat. No. 7,802,073.

(51) Int. Cl.
    *G06F 9/455*     (2006.01)
    *G06F 15/76*     (2006.01)

(52) U.S. Cl. .............................. 718/1; 718/108; 712/10

(58) Field of Classification Search ............... 718/1, 108
See application file for complete search history.

(56) References Cited

U.S. PATENT DOCUMENTS

| | | | |
|---|---|---|---|
| 5,179,663 A | 1/1993 | Iimura | |
| 5,737,615 A | 4/1998 | Tetrick | |
| 5,765,003 A | 6/1998 | MacDonald et al. | |
| 5,796,973 A | 8/1998 | Witt et al. | |
| 5,918,057 A | 6/1999 | Chou et al. | |
| 5,933,627 A | 8/1999 | Parady | |
| 5,968,167 A | 10/1999 | Whittaker et al. | |
| 6,079,008 A | 6/2000 | Clery, III | |
| 6,092,153 A | 7/2000 | Lass | |
| 6,269,391 B1 | 7/2001 | Gillespie | |
| 6,370,640 B1 | 4/2002 | Dowling | |
| 6,397,242 B1 | 5/2002 | Devine et al. | |
| 6,536,012 B1 | 3/2003 | Mizuno | |
| 6,550,020 B1 | 4/2003 | Floyd et al. | |
| 6,745,318 B1 | 6/2004 | Mansingh et al. | |
| 6,748,556 B1 | 6/2004 | Storino et al. | |
| 6,795,966 B1 * | 9/2004 | Lim et al. .......................... 718/1 |
| 6,804,632 B2 | 10/2004 | Orenstien et al. | |
| 6,957,435 B2 * | 10/2005 | Armstrong et al. ........... 718/104 |
| 7,000,051 B2 | 2/2006 | Armstrong et al. | |
| 7,020,800 B2 | 3/2006 | Fu et al. | |
| 7,035,997 B1 | 4/2006 | Musoll et al. | |

(Continued)

OTHER PUBLICATIONS

Office Action in U.S. Appl. No. 11/933,267 mailed Oct. 25, 2010 (27 pages).

(Continued)

*Primary Examiner* — Meng An
*Assistant Examiner* — Kevin X Lu
(74) *Attorney, Agent, or Firm* — Osha Liang LLP

(57) ABSTRACT

A virtual core management system including a physical core and a first virtual core including a collection of logical states associated with execution of a first program. The first virtual core is mapped to the physical core. The virtual core management system further includes a second virtual core including a collection of logical states associated with execution of a second program, and a virtual core management component configured to unmap the first virtual core from the physical core and map the second virtual core to the physical core in response to the virtual core management component detecting that the physical core is idle.

9 Claims, 27 Drawing Sheets

U.S. PATENT DOCUMENTS

| | | | |
|---|---|---|---|
| 7,035,998 B1 | 4/2006 | Nemirovsky et al. | |
| 7,055,060 B2 | 5/2006 | Nguyen et al. | |
| 7,089,341 B2 | 8/2006 | Kriegel | |
| 7,093,109 B1 | 8/2006 | Davis et al. | |
| 7,155,600 B2 | 12/2006 | Burky et al. | |
| 7,240,160 B1 | 7/2007 | Hetherington et al. | |
| 7,251,746 B2 | 7/2007 | Fox et al. | |
| 7,281,075 B2 | 10/2007 | Armstrong et al. | |
| 7,383,405 B2 * | 6/2008 | Vega et al. | 711/162 |
| 7,401,206 B2 | 7/2008 | Hetherington et al. | |
| 7,496,920 B1 | 2/2009 | Bandhole et al. | |
| 7,530,067 B2 | 5/2009 | Slegel et al. | |
| 7,555,422 B2 | 6/2009 | Newman et al. | |
| 7,613,897 B2 * | 11/2009 | Armstrong et al. | 711/173 |
| 7,765,543 B1 * | 7/2010 | Weissman et al. | 718/1 |
| 2002/0062352 A1 | 5/2002 | Asano et al. | |
| 2002/0129225 A1 | 9/2002 | Lindwer | |
| 2002/0161957 A1 | 10/2002 | Comeau et al. | |
| 2003/0101440 A1 | 5/2003 | Hardin et al. | |
| 2004/0006729 A1 | 1/2004 | Pendurkar | |
| 2004/0107369 A1 | 6/2004 | Cooper et al. | |
| 2004/0107374 A1 | 6/2004 | Cooper et al. | |
| 2004/0216102 A1 | 10/2004 | Floyd | |
| 2004/0216104 A1 | 10/2004 | Fluhr et al. | |
| 2004/0243868 A1 | 12/2004 | Toll et al. | |
| 2004/0250254 A1 * | 12/2004 | Frank et al. | 719/310 |
| 2005/0044308 A1 | 2/2005 | Rashid et al. | |
| 2005/0108711 A1 * | 5/2005 | Arnold et al. | 718/100 |
| 2005/0125629 A1 | 6/2005 | Kissell | |
| 2005/0132238 A1 | 6/2005 | Nanja | |
| 2005/0132362 A1 | 6/2005 | Knauerhase et al. | |
| 2005/0138442 A1 | 6/2005 | Keller et al. | |
| 2005/0149936 A1 | 7/2005 | Pilkington | |
| 2005/0154861 A1 | 7/2005 | Arimilli et al. | |
| 2005/0166074 A1 * | 7/2005 | Hack | 713/320 |
| 2005/0182915 A1 | 8/2005 | Devaney et al. | |
| 2005/0198422 A1 | 9/2005 | Galbraith et al. | |
| 2005/0283679 A1 * | 12/2005 | Heller et al. | 714/39 |
| 2006/0069936 A1 | 3/2006 | Lint et al. | |
| 2006/0095807 A1 | 5/2006 | Grochowski et al. | |
| 2006/0095913 A1 | 5/2006 | Bodas et al. | |
| 2006/0107262 A1 | 5/2006 | Bodas et al. | |
| 2006/0123416 A1 * | 6/2006 | Cibrario Bertolotti et al. | 718/1 |
| 2006/0150138 A1 | 7/2006 | Rhee | |
| 2006/0218328 A1 | 9/2006 | Vega et al. | |
| 2006/0242389 A1 * | 10/2006 | Browning et al. | 712/229 |
| 2006/0248317 A1 | 11/2006 | Vorbach et al. | |
| 2006/0294401 A1 | 12/2006 | Munger | |
| 2007/0033367 A1 | 2/2007 | Sakarda et al. | |
| 2007/0157042 A1 | 7/2007 | Jahagirdar et al. | |
| 2007/0234077 A1 | 10/2007 | Rothman et al. | |

OTHER PUBLICATIONS

Office Action in U.S. Appl. No. 11/933,349 mailed Sep. 1, 2010 (20 pages).

Office Action in U.S. Appl. No. 11/933,349 mailed Dec. 23, 2010 (12 pages).

Notice of Allowance in U.S. Appl. No. 11/933,297 mailed May 18, 2010 (9 pages).

Notice of Allowance in U.S. Appl. No. 11/781,726 mailed Jun. 14, 2010 (4 pages).

Khailany, B. et al., Imagine: Media Processing with Streams, IEEE Micro, Mar.-Apr. 2001, pp. 35-46 (12 pages).

* cited by examiner

VIRTUAL CORE MANAGEMENT

CROSS-REFERENCE TO RELATED APPLICATIONS

This application is a divisional of application Ser. No. 11/781,726, filed Jul. 23, 2007, which claims the benefit of U.S. Provisional Patent Application No. 60/832,823 filed on Jul. 23, 2006 and entitled "Managing Multiple Physical Core Processors to Behave as One Virtual Core Processor", which is incorporated herein by reference. This application is also a continuation-in-part application of, and claims the benefit of U.S. patent application Ser. No. 11/277,761 filed on Mar. 29, 2006 and entitled "Adaptive Computing Ensemble Microprocessor Architecture", which is incorporated herein by reference. This application is also a continuation-in-part of, and claims the benefit of benefit of U.S. patent application Ser. No. 11/279,882 and U.S. patent application Ser. No. 11/279,883, filed on Apr. 15, 2006.

BACKGROUND

As is generally known, computer systems have a processor adapted to process operating instructions and an operating system (OS) adapted to manage application programs. The operating system interacts with the processor to execute programs, instructions, tasks, threads, etc.

Many modern computer systems utilize a multi-core processor having two or more processor cores interfaced for enhanced performance or more efficient processing of multiple tasks and threads. In a multi-core processor, multiple cores may not be identical, wherein for example, some cores may consume less power while others may have higher performance. Also, multiple cores of a processor may be grouped into dependency groups so that cores within a dependency group may share computing resources, caches, power and/or frequency domains.

However, current operating systems are largely unaware of multi-core processing techniques that achieve optimal performance and/or power with non-identical multi-core processors, and current operating systems typically fail to recognize the different characteristics and inter-dependencies of non-identical multi-cores to schedule threads for optimal performance and/or power. Even if current operating systems were adapted to be aware of these differences, the performance and/or power demand of a given thread may change dynamically, and moving a thread from one core to another core by a software means would be problematic with long latency issues. Hence, current operating systems do not optimize multi-core processing techniques.

SUMMARY

Embodiments of the present disclosure overcome the deficiencies of the above prior computing systems by providing systems and methods for virtual core management (VCM) that allow multi-core processors to expose a fixed number of virtual cores to an external computing environment, including BIOS (basic input/output system), OS (operating system), application software and chipsets, while mapping the virtual processing cores to a pool of symmetric or asymmetric physical processing cores.

In accordance with embodiments of the invention, a virtual core management (VCM) system is adapted for use with a computer processor having one or more physical cores. The VCM system includes a virtual core management component adapted to map one or more virtual cores to at least one of the physical cores to enable execution of one or more programs by the at least one physical core. The one or more virtual cores include one or more logical states associated with the execution of the one or more programs. The VCM system may include a memory component adapted to store the one or more virtual cores. The virtual core management component may be adapted to transfer the one or more virtual cores from the memory component to the at least one physical core.

In accordance with embodiments of the invention, a virtual core includes a collection of logical states associated with the execution of one or more programs. The collection of logical states includes an architectural state and persistent micro-architectural state of a physical core. The collection of logical states may include a transient micro-architectural state. The architectural state includes a collection of logical states that are defined by the execution of one or more programs. A micro-architectural state includes a collection of logical states that are defined by the execution of one or more programs on a physical core. The persistent micro-architectural state includes a subset of the micro-architectural state that should be preserved during the execution of one or more programs on a physical core in order to achieve a correct result. The transient micro-architectural state includes a subset of the micro-architectural state that does not need to be preserved during the execution of one or more programs on a physical core in order to achieve the correct result.

These and other features and advantages of the invention will be more readily apparent from the detailed description of the embodiments set forth herein taken in conjunction with the accompanying drawings.

DETAILED DESCRIPTION

Embodiments of the present disclosure provide systems and methods for redirecting processor input (e.g., interrupt signals) intended for one or more virtual cores (VCores) to one or more physical cores (PCores) of a processor utilizing a virtual core management (VCM) component comprising, in one example, a VCM controller, a transaction redirection component and one or more virtual core interrupt controllers.

Embodiments of the present disclosure provide systems and methods for redirecting transaction signals (e.g., register/memory mapped IO accesses) to one or more PCores to an intended destination based on mapping of one or more VCores.

Embodiments of the present disclosure provide systems and methods for detecting various conditions that may trigger VCM remapping including intercepting OS (operating system) P-state (performance state) requests, intercepting OS C-state (CPU state) requests, detecting when a VCore is not mapped to a PCore, detecting resource contention among shared resources, sensing temperature in physical cores and detecting error conditions in physical cores.

Embodiments of the present disclosure provide systems and methods for determining remap parameters for VCores onto PCores utilizing an algorithm.

Embodiments of the present disclosure provide systems and methods for storing and/or restoring one or more VCore states.

Embodiments of the present disclosure provide systems and methods for flushing internal pipeline states, cache states, etc. in a PCore.

Embodiments of the present disclosure provide systems and methods for utilizing a VCM control unit to configure, manage, maintain, coordinate and implement various processes and functions described herein.

Figure 1A:
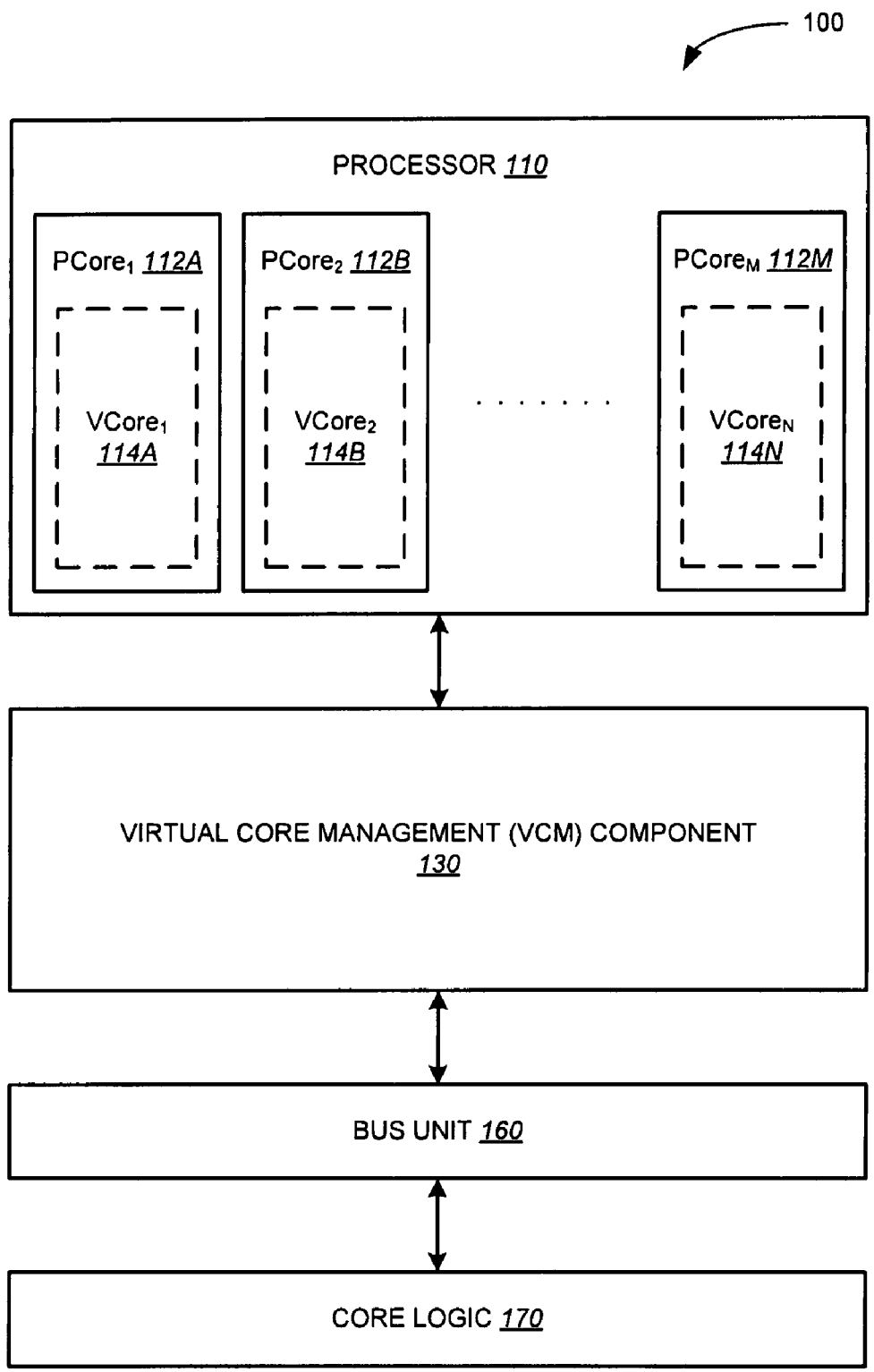
FIG. 1A shows a block diagram illustrating a virtual core management (VCM) system in accordance with an embodiment of the present disclosure.

FIG. 1A shows an embodiment of a virtual core management (VCM) system 100 having a processor core complex 110, a VCM component 130, a bus unit 160 and core logic 170. In various implementations, VCM system 100 comprises a computer system having program storage, at least one processor core complex and various input/output (IO) components. VCM system 100 and/or other VCM systems of the present disclosure may include various additional components, such as, for example, sensors, error detectors, shared resource units (e.g., one or more SSE (Streaming SIMD Extension) units, caches, etc.), and other components further described herein which may be used to provide various features also further described herein.

In one embodiment, processor core complex 110 comprises a processing device, such as a microprocessor, microcontroller, digital signal processing (DSP) device, or another generally known processing device configured to and capable of executing one or more programs, a series of instructions, tasks, threads, etc. Processor core complex 110 may comprise a multi-core processor having a collection of one or more physical cores, such as PCores 112A-112M, wherein a physical core is an apparatus adapted to execute one or more programs. In one implementation, processor core complex 110 may include one or more sets of hardware resources adapted for use with each physical core, such that each physical core has a set of hardware resources associated therewith.

In various implementations, a multi-core processor comprises an integrated circuit having a plurality of processor cores working in conjunction for enhanced performance, reduced power consumption and more efficient processing of multiple tasks and/or threads. Processor core complex 110 may be configured to process instructions, such as, for example, an x86 processor for running operating systems and applications. Moreover, processor core complex 110 may be configured to process instructions in parallel (e.g., parallel processing) utilizing one or more of the PCores 112A-112M. It should be appreciated that processor core complex 110 may comprise a conventional processor including a conventional multi-core processor without departing from the scope of the present disclosure.

In one embodiment, PCores 112A-112M comprise physical processing cores that are configured to execute one or more programs, a series of instructions, tasks, threads, etc. PCores 112A-112M may be integrated as part of a central processing unit (CPU), such as processor core complex 110, comprising a multi-core processor, and PCores 112A-112M may be configured to work together for enhanced performance, reduced power consumption and more efficient processing of multiple tasks and/or threads. PCores 112A-112M may be configured to process application programming code and instructions including x86 processing for running operating systems and applications. In general, a program comprises a series of instructions.

In one embodiment, virtual core management (VCM) component 130 comprises logic circuitry, such as, for example, a processor (e.g., microprocessor, microcontroller, etc.), adapted to configure, manage, maintain, coordinate and implement various processes and functions described herein. In various other embodiments, VCM component 130 may comprise a finite state machine or a programmable processing unit separate from processor core complex 110.

In one embodiment, VCM component 130 comprises a management component, apparatus or device adapted to perform mapping of one or more VCores 114A-114N, to one or more PCores 112A-112M. In various implementations, mapping comprises a process of assigning a virtual core to a physical core, which is discussed in greater detail herein. VCM component 130 is adapted to communicate with processor core complex 110, including PCores 112A-112M, bus unit 160, and core logic 170 via bus unit 160. VCM component 130 may comprise an on-chip or off-chip processing component adapted to execute instructions.

In one embodiment, VCM component 130 is adapted to map one or more VCores 114A-114N, onto one or more PCores 112A-112M, to enable execution of one or more programs, which may include a series of instructions, a set of instructions, an instruction sequence, etc. VCM component 130 may also be adapted to transfer one or more states of a virtual core to a physical core to execute one or more programs associated with the virtual core on the physical core.

In one embodiment, a virtual core comprises a collection of logical states associated with the execution of one or more programs. The collection of logical states includes an architectural state and persistent micro-architectural state of a physical core. The collection of logical states may include a transient micro-architectural state.

In one embodiment, the architectural state comprises the collection of logical states that are defined by the execution of one or more programs. A micro-architectural state comprises the collection of logical states that are defined by the execution of one or more programs on a physical core. The persistent micro-architectural state comprises a subset of the micro-architectural state that should be preserved during the execution of one or more programs on a physical core in order to achieve a correct result (e.g., machine-specific registers, performance counters, debug registers, machine-check architecture registers, etc.). The transient micro-architectural state comprises a subset of the micro-architectural state that does not need to be preserved during the execution of one or more programs on a physical core in order to achieve the correct result (e.g., caches and branch-prediction tables).

In one embodiment, a VCore may comprise a programming model, which includes information related to the processor and physical cores as held by an operating system (OS) and applications running on the OS. In one implementation, the programming model may include information managed by the OS, which may not be aware of virtual core mapping to physical cores. The information may include power and performance capabilities of the physical cores, operating status of the physical cores, and dependency relationships between physical cores.

In one embodiment, VCM component 130 may be adapted to receive one or more software commands from one or more programs executing on one or more PCores 112A-112M. In one example, a software command may indicate that the execution of one or more programs associated with a virtual core should be suspended, and VCM component 130 may be adapted to unmap the associated virtual core in response to the software command. In another example, a software command may indicate that the execution of one or more programs associated with a virtual core should be resumed, and VCM component 130 may be adapted to map the associated virtual core to a physical core in response to the software command.

In one embodiment, PCores 112A-112M may comprise one or more multi-threaded physical cores, which comprises a physical core equipped to execute multiple programs simultaneously or in successive clock periods. In one implementation, VCM component 130 may be configured to simultaneously map more than one virtual core, such as one or more VCores 114A-114N to the multi-threaded physical core.

As shown in FIG. 1A, one or more VCores 114A-114N may be mapped to one or more PCores 112A-112M by VCM component 130. In one embodiment, a VCore comprises a collection of states (e.g., logical states, architectural states and micro-architectural states) related to a physical core as viewed by architectural software and other chips/hardware in a system, such as, for example, VCM system 100. In various implementations, one or more VCore states may be mapped to a single hardware component or migrated between a plurality of hardware components.

In one embodiment, mapping a VCore to a PCore may comprise allowing one or more VCore states to run on a designated PCore. Depending on a current state of a VCore and PCore, the mapping may include changing physical-to-virtual tables, which allows communicating to a PCore or restoring a VCore state. Once mapping has occurred, a VCore is mapped to a PCore. If a VCore is not mapped to a PCore, the VCore is unmapped. By extension, a PCore may also be mapped or unmapped. As described herein, migrating a VCore comprises unmapping a VCore from a PCore and then mapping the VCore to another PCore.

In one embodiment, VCM component 130 may be adapted to save and/or restore a VCore state. In one example, saving may comprise reading a movable VCore state from one or more registers or other locations and storing the movable VCore state external to the PCore. In another example, restoring may comprise reading a stored VCore state from memory and writing the VCore state to one or more PCore registers or various other locations. The movable part of a VCore state (i.e., a VCore state that may be mapped to and executed by different PCores) may be backed up in the memory component. It should be appreciated that some VCore states may exist in the memory component and read/written as needed, and different types of PCore hardware (e.g., different types of registers) may be handled in different ways by a virtual core management system.

In various implementations, as discussed in greater detail herein, VCM component 130 may be adapted to map one or more VCores 114A-114N, to one or more PCores 112A-112M, in response to a signal related to various conditions. In one example, the signal may indicate a request to improve the performance of one or more programs. In another example, the signal may indicate a request to reduce power consumption of one or more programs. In another example, the signal may indicate a request to improve energy efficiency of one or more programs. In another example, the signal may indicate a temperature measurement of at least one of PCores 112A-112M. In still another example, the signal may indicate an error condition in at least one of PCores 112A-112M.

In one embodiment, bus unit 160 comprises circuitry that provides a common pathway between resources and components. In one implementation, bus unit 160 comprises a component of system 100 that connects processor core complex 110 to other components of system 100. In another implementation, as shown in FIG. 1A, bus unit 160 may be adapted to interface core logic 170 to processor core complex 110, including PCores 112A-112M, via VCM component 130.

In one embodiment, core logic 170 comprises circuitry that implements one or more capabilities of a motherboard chipset architecture. In one example, core logic 170 comprises a southbridge (SB) type of circuitry that may be known as an I/O (input/output) Controller Hub (ICH), which may comprise a chip that implements one or more capabilities of a motherboard in a generally known northbridge/southbridge type of chipset computer architecture. In some embodiments, the SB circuitry may not be directly connected to the CPU, such as processor core complex 110, and rather, a northbridge type of circuitry may be adapted to connect the southbridge to the CPU. It should be appreciated that core logic 170 may or may not include one or more portions of circuitry related to a conventional processor.

Figure 1B:
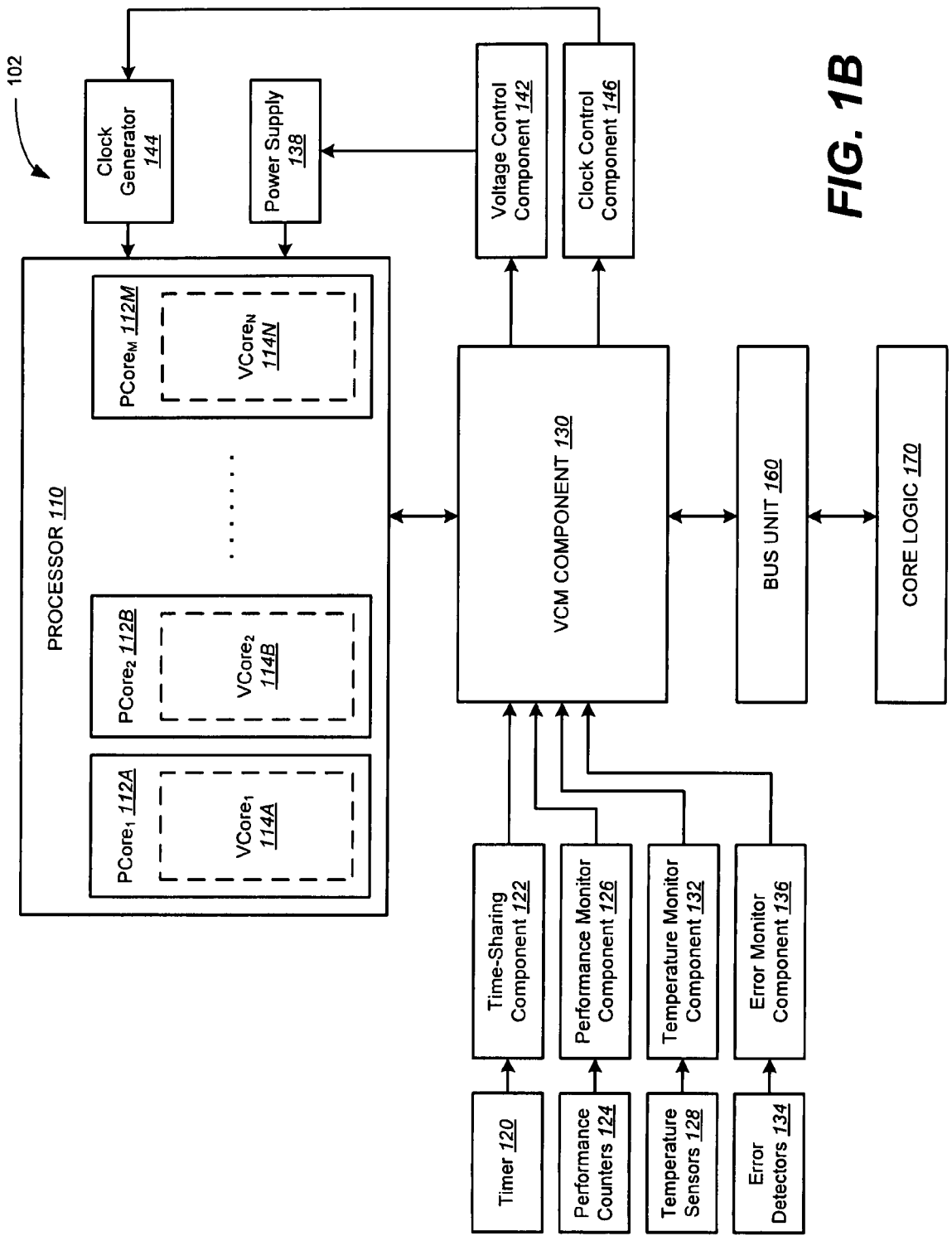
FIG. 1B shows a block diagram illustrating a VCM system in accordance with another embodiment of the present disclosure.

FIG. 1B shows another embodiment of a VCM system 102 having processor core complex 110, VCM component 130, bus unit 160 and core logic 170. It should be appreciated that VCM system 102 is similar in scope and function to VCM system 100 of FIG. 1A. Hence, VCM system 102 of FIG. 1B is utilized to show another embodiment of VCM 100 of FIG. 1A with additional system components added thereto.

In one embodiment, as shown in FIG. 1B, VCM system 102 includes a timer 120, a time-sharing component 122, one or more performance counters 124, a performance monitor component 126, one or more temperature sensors 128, a temperature monitor component 132, one or more error detectors 134, and an error monitor component 136.

In one embodiment, timer 120 comprises a component that measures the passage of time. In one embodiment, timesharing component 122 comprises a component that directs VCM component 130 to perform mapping based on operation of timer 120. In one implementation, timer 120 may be adapted to measure a passage of time, and time-sharing component 122 may be adapted to provide time measurements from timer 120 to VCM component 130, which may be configured to consider time measurements as a factor in selecting a physical core to which to map a virtual core.

In one embodiment, the one or more performance counters 124 comprise one or more components that observe execution of one or more programs on a physical core, such as PCores 112A-112M. For example, the usage of execution units, caches, etc. In one embodiment, performance monitor component 126 comprises a component that directs VCM component 130 to perform mapping of VCores 114A-114N, to PCores 112A-112M, based on information received from the one or more performance counters 124. In one implementation, VCM component 130 may be configured to consider performance as a factor in selecting a physical core to which to map a virtual core. In another implementation, VCM component 130 may be configured to consider power consumption as a performance factor in selecting a physical core to which to map a virtual core. In another implementation, VCM component 130 may be configured to consider a power threshold as a performance factor in selecting a physical core to which to map a virtual core. In another implementation, VCM component 130 may be configured to consider energy efficiency as a performance factor in selecting a physical core to which to map a virtual core. In various embodiments, it should be appreciated that selecting a physical core to which to map a virtual core may be considered selecting a virtual core for mapping to a physical core without departing from the scope of the present disclosure.

In one embodiment, the one or more performance counters 124 may be adapted to measure performance characteristics of the PCores 112A-112M, and performance monitor component 126 may be adapted to provide performance measurements from the one or more performance counters 124 to VCM component 130, which may be configured to consider the performance of the physical cores as a factor in selecting a physical core to which to map a virtual core. In various examples, performance characteristics may include at least one of an execution unit utilization, a cache utilization, a pipeline utilization, and an internal bus utilization.

In one embodiment, the one or more temperature sensors 128 comprise one or more components that sense the temperature of PCores 112A-112M. In one embodiment, temperature monitor component 132 comprises a component that directs VCM component 130 to perform mapping of VCores 114A-114N, to PCores 112A-112M, based on information received from the one or more temperature sensors 128. In one implementation, temperature monitor component 132 may be adapted to provide temperature measurements from the one or more temperature sensors 128 to VCM component 130, which may be configured to consider the temperature of the physical cores as a factor in selecting a physical core to which to map a virtual core.

In one embodiment, the one or more error detectors 134 comprise one or more components of a physical core, such as PCores 112A-112M, that is adapted to detect errors in operation of the physical core. In one embodiment, error monitor component 136 comprises a component that directs VCM component 130 to perform mapping of VCores 114A-114N, to PCores 112A-112M, based on information received from the one or more error detectors 134. In one implementation, the one or more error detectors 134 may be adapted to observe errors in the operation of physical cores, such a PCores 112A-112M, and error monitor component 136 may be adapted to provide the error observations from the one or more error detectors 134 to VCM component 130, which may be configured to consider error observations as a factor in selecting a physical core to which to map a virtual core.

In one embodiment, as shown in FIG. 1B, VCM system 102 includes a power supply 138, a voltage control component 142, a clock generator 144 and a clock control component 146.

In one embodiment, power supply 138 comprises a component that is adapted to provide power to processor core complex 110 including the one or more PCores 112A-112M. Power supply 138 may comprise various types of power storage components, such as battery, or a power interface component that is adapted to receive external power and convert the received external power to a useable power for processor core complex 110 including the one or more PCores 112A-112M. Power supply 138 may be adapted to supply multiple independent power sources (for example, different voltages) to various portions of processor core complex 110.

In one embodiment, voltage control component 142 comprises a component that controls the voltage supplied to the PCores 112A-112M, by the power supply 138 based on signals received from VCM component 130. In one example, VCM component 130 may be adapted to indicate to voltage control component 142 an increase in a voltage of power supplied to one or more PCores 112A-112M. In another example, VCM component 130 may be adapted to indicate to voltage control component 142 a reduction in a voltage of power supplied to one or more PCores 112A-112M.

In one embodiment, clock generator 144 is adapted to generate a clock signal based on based on signals received from VCM component 130.

In one embodiment, clock control component 146 comprises a component that controls one or more clock signals supplied to PCores 112A-112M, based on signals received from VCM component 130. In one example, VCM component 130 may be adapted to indicate to the clock control component an increase in frequency of the clock signal to one or more PCores 112A-112M. In another example, VCM component 130 may be adapted to indicate to the clock control component a reduction in a frequency of the clock signal to one or more PCores 112A-112M.

Figure 2A:
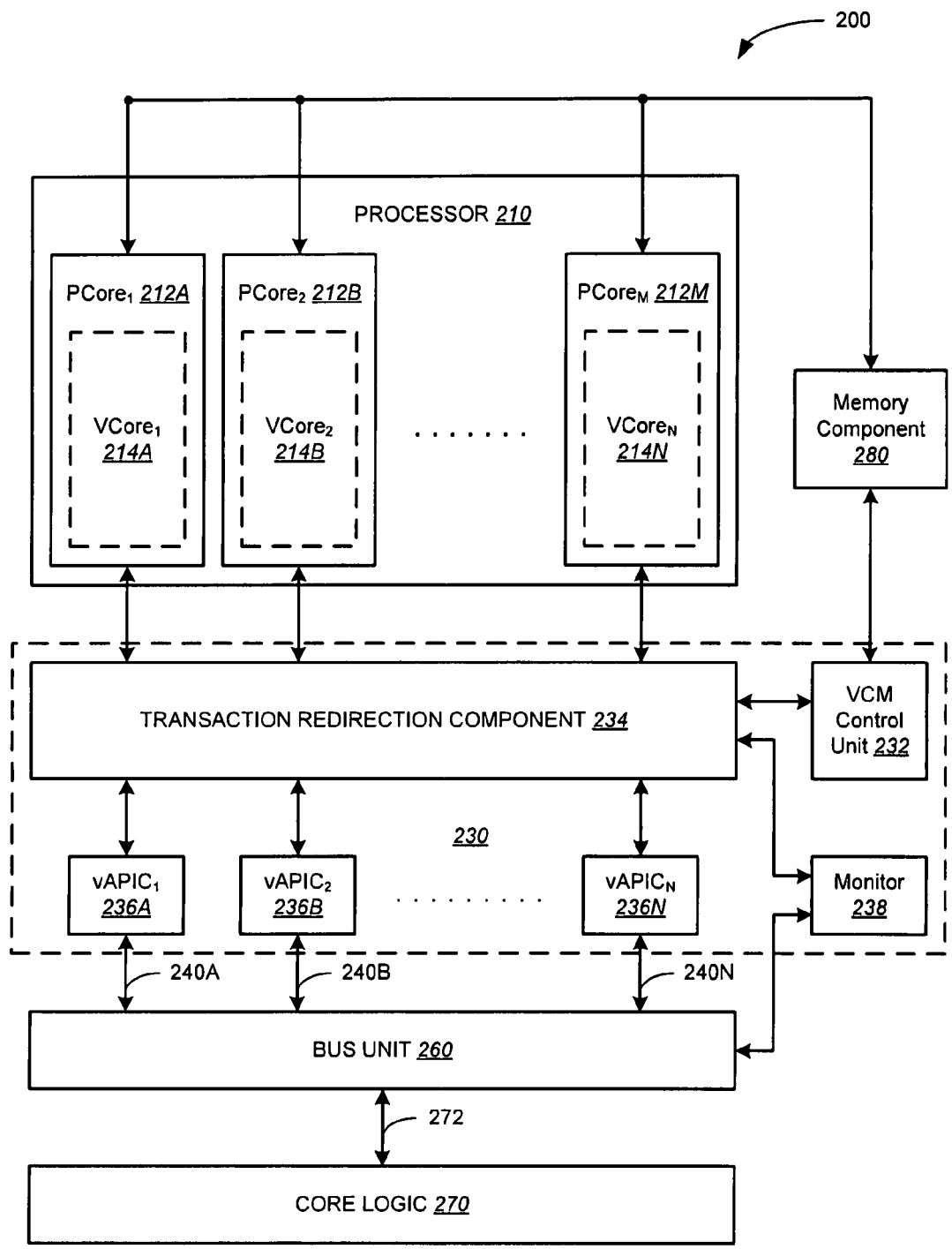
FIGS. 2A-2H show various block diagrams illustrating VCM systems in accordance with various embodiments of the present disclosure.

FIG. 2A shows an embodiment of a VCM system 200 having a processor core complex 210, a VCM component 230, a bus unit 260 and core logic 270.

In one embodiment, processor core complex 210, VCM component 230, bus unit 260 and core logic 270 are similar in scope and function to processor core complex 110, VCM component 130, bus unit 160 and core logic 170 of FIGS. 1A and 1B.

In one embodiment, processor core complex 210 may comprise a multi-core processor having any number of PCores 212A-212M, which are similar in scope and function to PCores 112A-112M of FIGS. 1A and 1B.

In one embodiment, VCM component 230 comprises logic circuitry, such as, for example, a VCM control unit 232, a transaction redirection component (TRC) 234, one or more virtual core interrupt controllers (vAPIC) 236A-236N and a monitor 238. It should be appreciated that VCM control unit 232, TRC 234, vAPICs 236A-236N and monitor 238 may comprise separate components of system 200 or may be integrated as part of VCM component 230, which may comprise similar scope and function as VCM component 130 of FIGS. 1A and 1B. Further aspects of VCM control unit 232, TRC 234, vAPICs 236A-236N, and monitor 238 will be further discussed in greater detail herein.

In one embodiment, VCM control unit 232 comprises a processor (e.g., microprocessor, microcontroller, etc.), adapted to configure, manage, maintain, coordinate and implement various processes and functions described herein. VCM control unit 232 may comprise an on-chip or off-chip processing component adapted to execute instructions. VCM control unit 232 is adapted to communicate with processor core complex 210, including PCores 212A-212M, bus unit 260, and core logic 270 via bus unit 260.

In one embodiment, VCM control unit 232 is adapted to assign (e.g., map) one or more VCores 214A-214N to one or more of the PCores 212A-212M.

In one embodiment, transaction redirection component (TRC) 234 comprises a component adapted to route software and/or hardware signals between the PCores 212A-212M, and bus unit 260. In one example, TRC 234 tracks a physical core number for each PCore 212A-212M that corresponds to or is associated with at least one VCore 214A-214N. TRC 234 is adapted to determine whether one or more VCores 214A-214N are mapped to one or more PCores 212A-212M. For instance, VCM control unit 232 may be adapted to map particular VCores 214A-214N to particular PCores 212A-212M, and VCM control unit 232 may be further adapted to configure TRC 234 such that interrupt signals 240A-240N received from vAPICs 236A-236N may be routed to particular VCores 214A-214N running on particular PCores 212A-212M.

In one embodiment, TRC 234 may be adapted to connect signals between PCores 212A-212M and bus unit 260 according to the mapping of VCores 214A-214N to PCores 212A-212M. The signals may include at least one of a set of interrupt signals, a set of error signals, a set of input signals, and a set of output signals. TRC 234 may comprise an exception handler component, as discussed in reference to FIG. 13, which may be adapted to detect transactions associated with VCores 214A-214N that are not mapped to PCores 212A-212M. Hence, in one example, TRC 234 may be adapted to detect transactions associated with VCores 214A-214N that are not mapped to PCores 112A-112M and VCM control unit 232 may be configured to map an associated VCore to a PCore in response to the detected transactions. Further scope and function of these features will be discussed in greater detail herein.

In one embodiment, TRC 234 may be configured as an interrupt redirection table (IRT) that comprises a set of muxes (e.g., multiplexers) adapted to direct and/or redirect various interrupt signals 240A-240N from bus unit 160 to PCores 212A-212M, respectively. In one embodiment, transactions comprise software requests, hardware requests and/or responses associated with a virtual core, which may encompass interrupts, error signals, etc.

In general, an interrupt is an asynchronous signal from hardware indicating an event needing attention or a synchronous event in software indicating a need for a change in execution. A hardware interrupt causes the processing component to store its current state of execution via a context switch and execute an interrupt handler. A software interrupt is typically implemented as an instruction, which causes a context switch to an interrupt handler similar to a hardware interrupt. In computing systems, interrupts are processing techniques utilized for computer multitasking, and the act of interrupting is commonly referred to as an interrupt request ("IRQ").

In one embodiment, one or more of the virtual core interrupt controllers (vAPIC) 236A-236N comprise logic circuitry adapted to accept and process transactions (e.g., interrupt messages) received from a system bus, such as bus unit 260. In one example, as shown in FIG. 2A, each VCore 214A-214N may be adapted to have a corresponding vAPIC 236A-236N, respectively. However, as will be discussed herein, other various configurations may be implemented in VCM system 200 without departing from the scope of the present disclosure.

In general, a Programmable Interrupt Controller (PIC) allows assigning of priority levels to interrupt outputs, wherein the PIC asserts interrupts in a priority order. PICs comprise a plurality of registers including an Interrupt Request Register (IRR), an In-Service Register (ISR) and an Interrupt Mask Register (IMR). The IRR specifies interrupts that are pending acknowledgement, the ISR register specifies interrupts that have been acknowledged but waiting for an End Of Interrupt (EOI), and the IMR specifies interrupts that are to be ignored and not acknowledged. An Advanced Programmable Interrupt Controller (APIC) is a more intricate Programmable Interrupt Controller (PIC) comprising more outputs and more complex priority schemas.

In one implementation, the OS software and chipset are only aware of VCores and/or vAPICs, and transactions 272 from core logic 270 to PCores 212A-212M may be tagged with a VCore as a destination (e.g., in the form of APIC ID), and an appropriate vAPIC 236A-236N may be adapted to accept a corresponding transaction (e.g., interrupt message) 240A-240N. The inter-processor-interrupts (IPIs) are initiated by software, which may only be aware of VCores. Thus, in one example, the IPI may be tagged with a vAPIC ID for redirection. Further scope and function of these features are discussed in greater detail herein.

In one embodiment, monitor 238 comprises logic (e.g., logic circuitry) that may be adapted to monitor one or more areas of memory (e.g., one or more cache lines) on behalf of one or more physical cores and may be adapted to send a signal to the one or more physical cores when an access is completed to at least a portion of the monitored memory area with an explicit or implicit intent to write to the monitored area.

In one embodiment, bus unit 260 comprises circuitry that provides a common pathway between resources and components. In One example, bus unit 260 interfaces core logic 270 to processor core complex 210 including PCores 212A-212M via vAPICs 236A-236N and TRC 234. In another example, core logic 270 is similar in scope and function as core logic 170 of FIGS. 1A and 1B.

In one embodiment, VCM system 200 comprises a memory component 280 configured to store code, data, information and/or instructions from processor core complex 210, including PCores 212A-212M, and VCM component 230, including VCM control unit 232. Memory component 280 may comprise various types of on-chip or off-chip memory components, such as, for example, a volatile memory device including RAM (random access memory), SRAM (static RAM), DRAM (dynamic RAM), etc., or a non-volatile memory device including flash memory, etc. For example, in various embodiments, memory component 280 (and other memory components described herein) may be implemented as part of a processor or separate from a processor, and may be controlled by a memory controller that is part of a processor or separate from a processor (e.g., a memory controller provided by a northbridge chipset). In one embodiment, memory component 280 may be implemented separately from a processor and may be controlled by a DRAM controller of a processor to hide a portion of memory of memory component 280 from access by one or more programs running on the processor. Memory component 280 may also comprise a scratch pad memory and/or a scratch pad memory component.

It should be appreciated that, in various embodiments, VCM control unit 232 may be adapted to support multi-threaded physical cores. Hence, in various embodiments of VCM system 200, processor 210 may be adapted to comprise one or more multi-threaded physical cores, wherein one or more of PCores 212A-212M may be comprise a multi-threaded physical core. It should be appreciated that this concept may be applied to any of the embodiments of VCM as discussed and presented herein.

FIGS. 2B-2H provide various embodiments of configurations for processor core complex 210, PCores 212, VCores 214, VCM control unit 232, TRC 234 and vAPICs 236 in VCM system 200 of FIG. 2A.

Figure 2B:
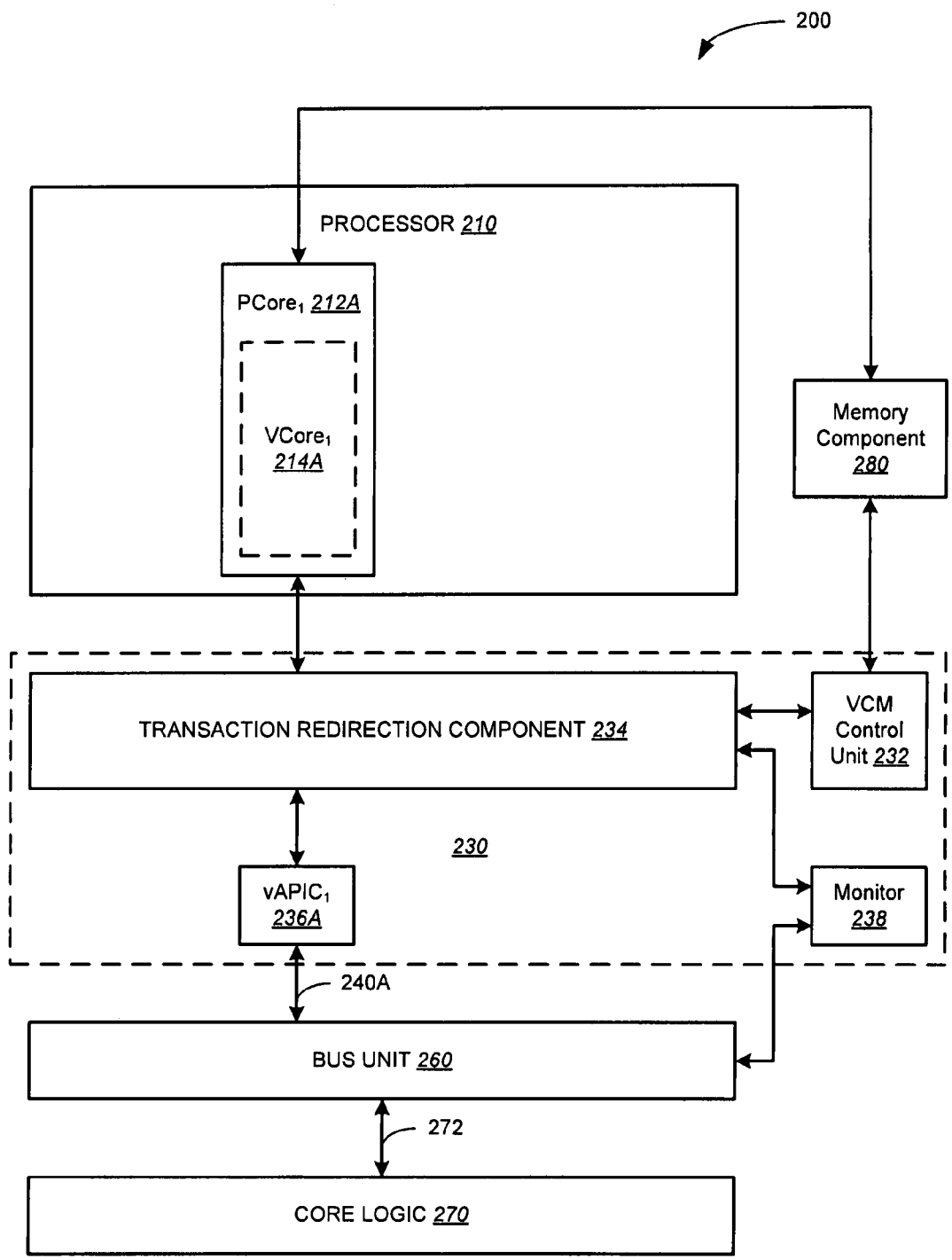

In one embodiment, as shown in FIG. 2B, processor core complex 210 may be adapted to comprise a single PCore 212A. VCM control unit 232 may be adapted to map a single VCore 214A to single PCore 212A. In one example, VCore 214A is adapted to have a corresponding vAPIC 236A, which is adapted to accept and process transactions received from bus unit 260 and transfer the transactions to VCore 214A via TRC 234. In this example, VCM control unit 232 assigns vAPIC 236A to VCore 214A and coordinates the transfer of transactions from vAPIC 236A to VCore 214A.

Figure 2C:
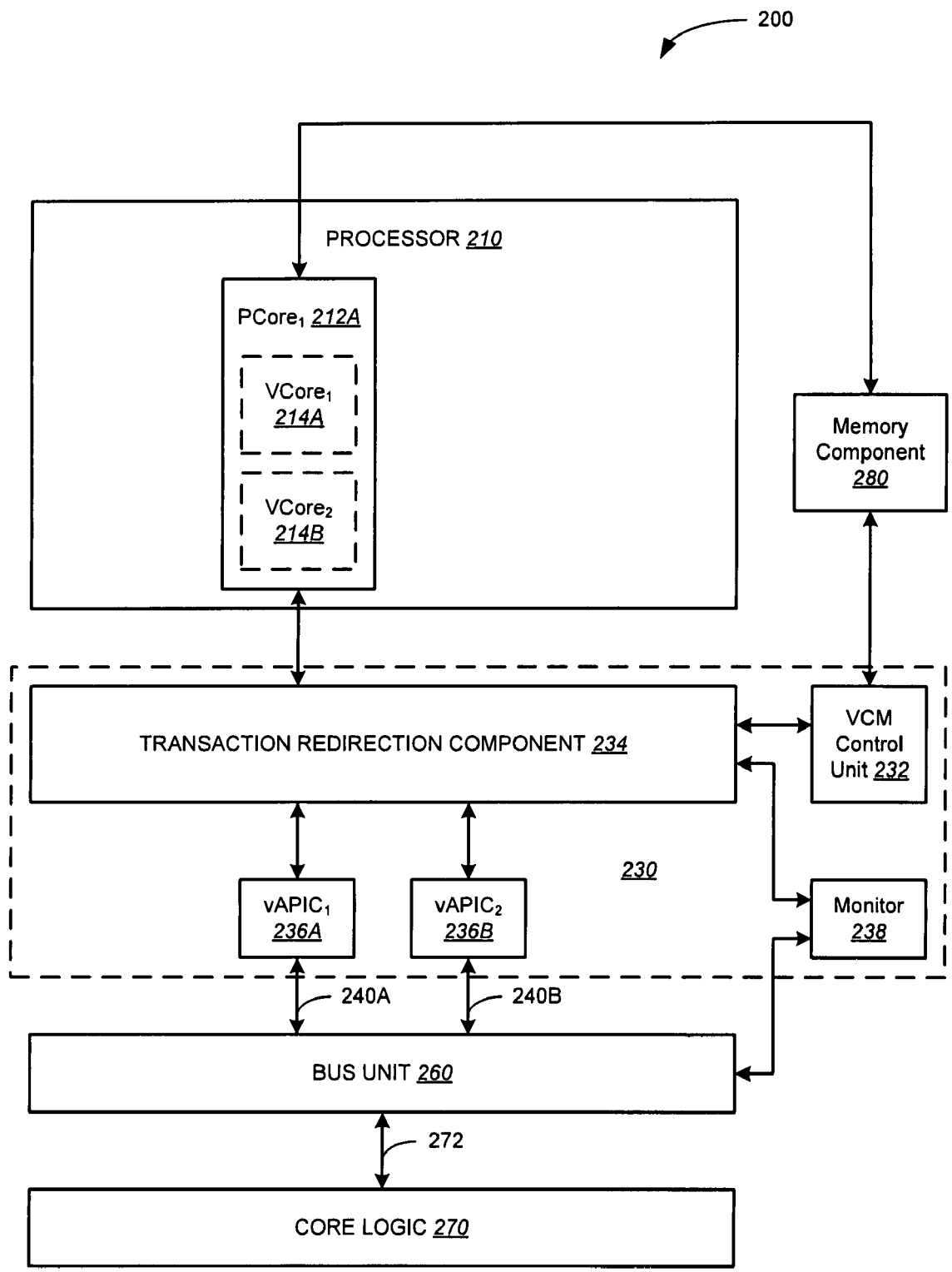

In one embodiment, as shown in FIG. 2C, processor core complex 210 may be adapted to comprise a single PCore 212A. VCM control unit 232 may be adapted to map a plurality of VCores 214A, 214B to single PCore 212A. In one example, processor core complex 210 may appear to an OS to have a plurality of physical cores, but as shown, VCM component 230 may be adapted to execute a plurality of VCores 214A-214B on single PCore 212A either in an alternating manner or multi-threading manner, which is discussed in greater detail herein. Hence, VCM control unit 232 may show the OS two virtual cores by mapping two VCores 214A and 214B to single PCore 212A.

As shown in FIG. 2C, VCores 214A and 214B are adapted to have corresponding vAPICs 236A and 236B, respectively, which are adapted to accept and process transactions received from bus unit 260 and transfer transactions to VCores 214A and 214B, respectively, via TRC 234. In one example, VCM control unit 232 assigns vAPIC 236A to VCore 214A and vAPIC 236B to VCore 214B and coordinates the transfer of transactions from vAPICs 236A and 236B to VCores 214A and 214B, respectively.

Figure 2D:
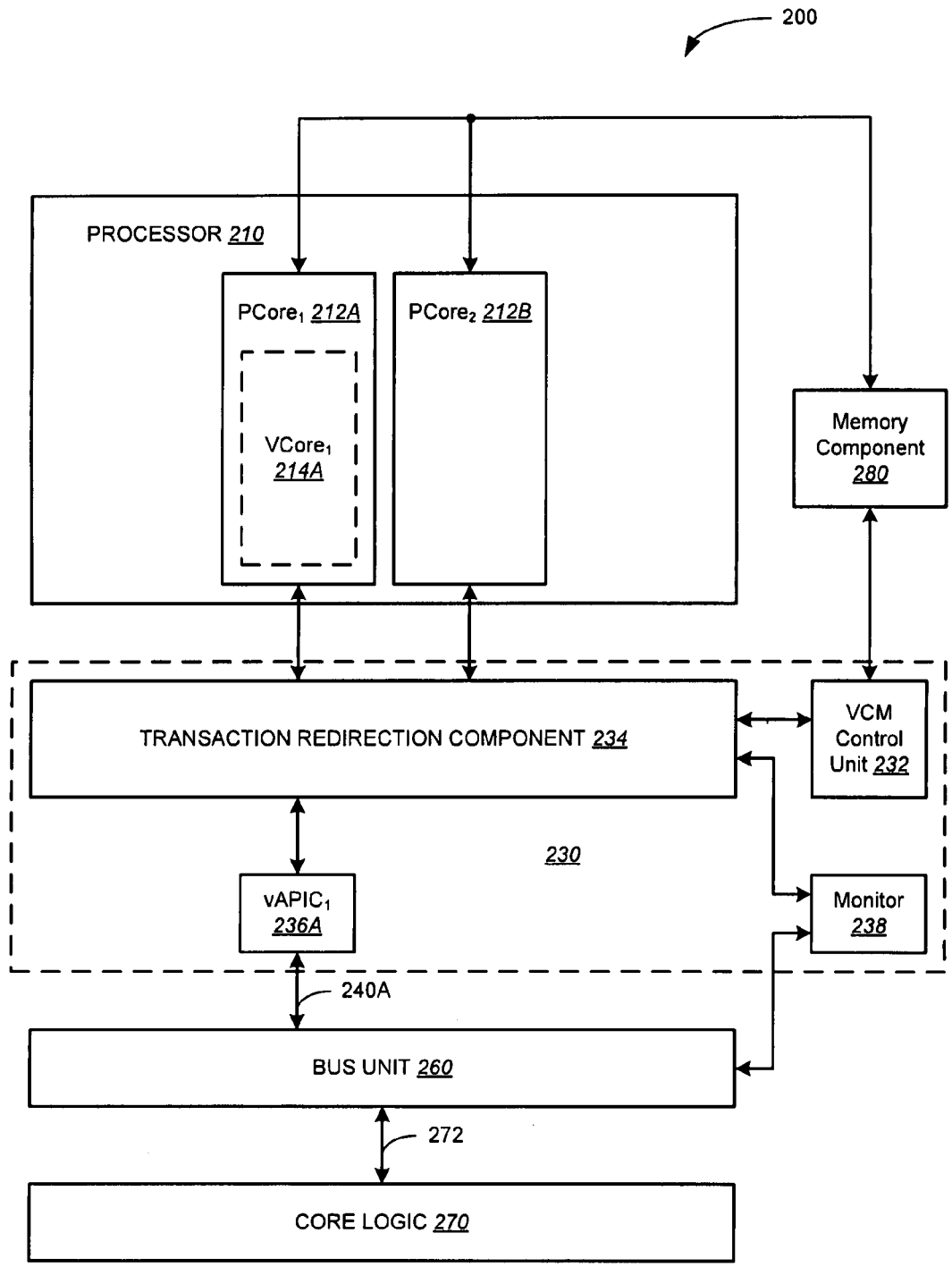

In one embodiment, as shown in FIG. 2D, processor core complex 210 may be adapted to comprise a plurality of PCores 212A, 212B. VCM control unit 232 is adapted to map a single VCore 214A to at least one of the PCores, such as a first PCore 212A. VCM control unit 232 may not map a VCore to second PCore 212B. Hence, in one example of processor core complex 210, VCM control unit 232 may be adapted to map a VCore to first PCore 212A and leave second PCore 212B without any VCore mapping.

As shown in FIG. 2D, VCore 214A is adapted to have corresponding vAPIC 236A, which is adapted to accept and process transactions received from bus unit 260 and transfer transactions via TRC 234 to VCore 214A, which resides on first PCore 212A. In one example, VCM control unit 232 assigns vAPIC 236A to VCore 214A and coordinates the transfer of transactions from vAPIC 236A to VCore 214A, which resides on first PCore 212A. However, as discussed in greater detail herein, VCM control unit 232 is adapted to remap VCore 214A to second PCore 212B.

Figure 2E:
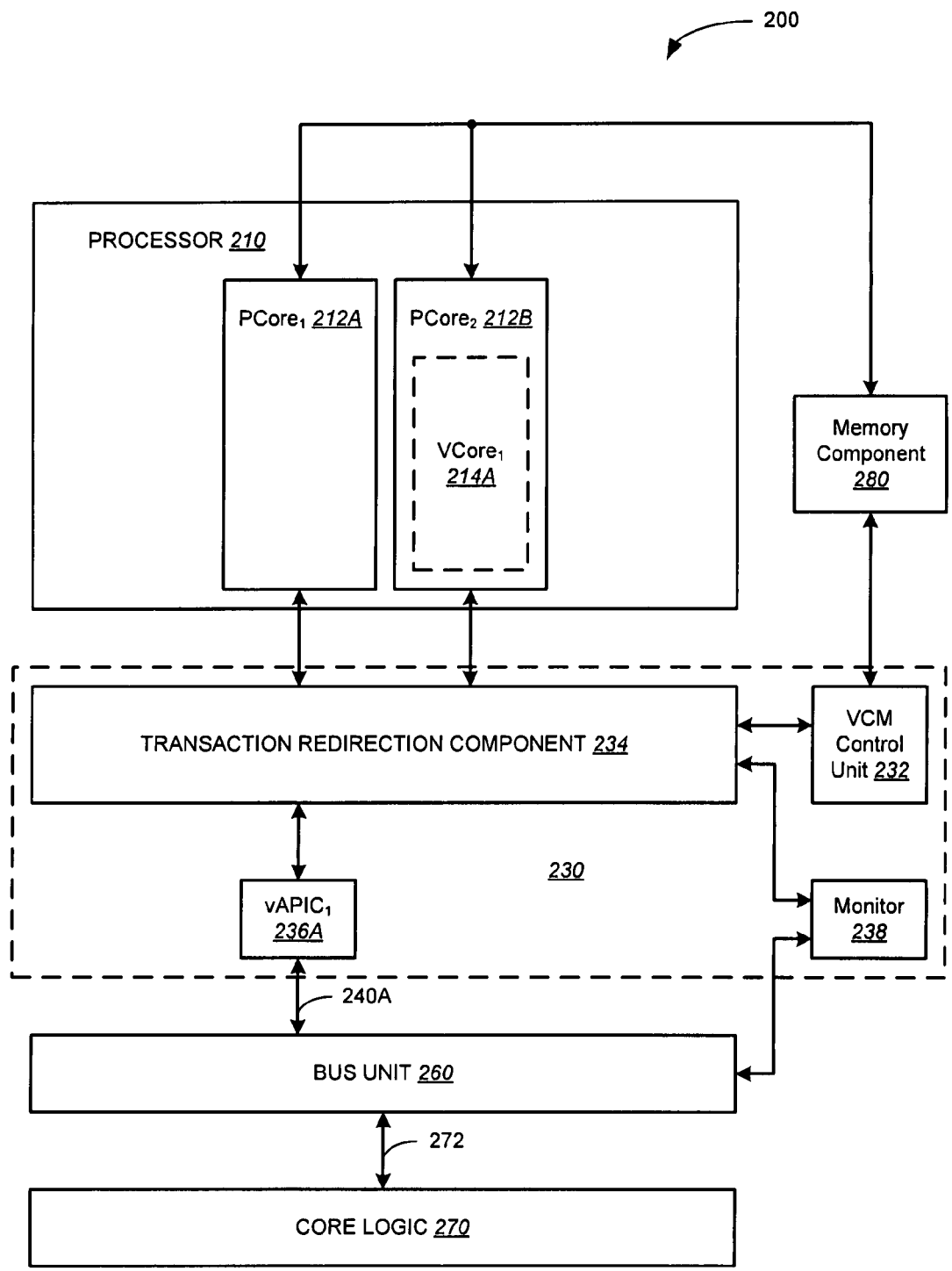

In one embodiment, as shown in FIG. 2E with reference to FIG. 2D, VCM control unit 232 may be adapted to remap VCore 214A from first PCore 212A to second PCore 212B. In one example, VCM control unit 232 assigns vAPIC 236A to VCore 214A and coordinates the transfer of transactions from vAPIC 236A to VCore 214A, which resides on second PCore 212B.

Figure 2F:
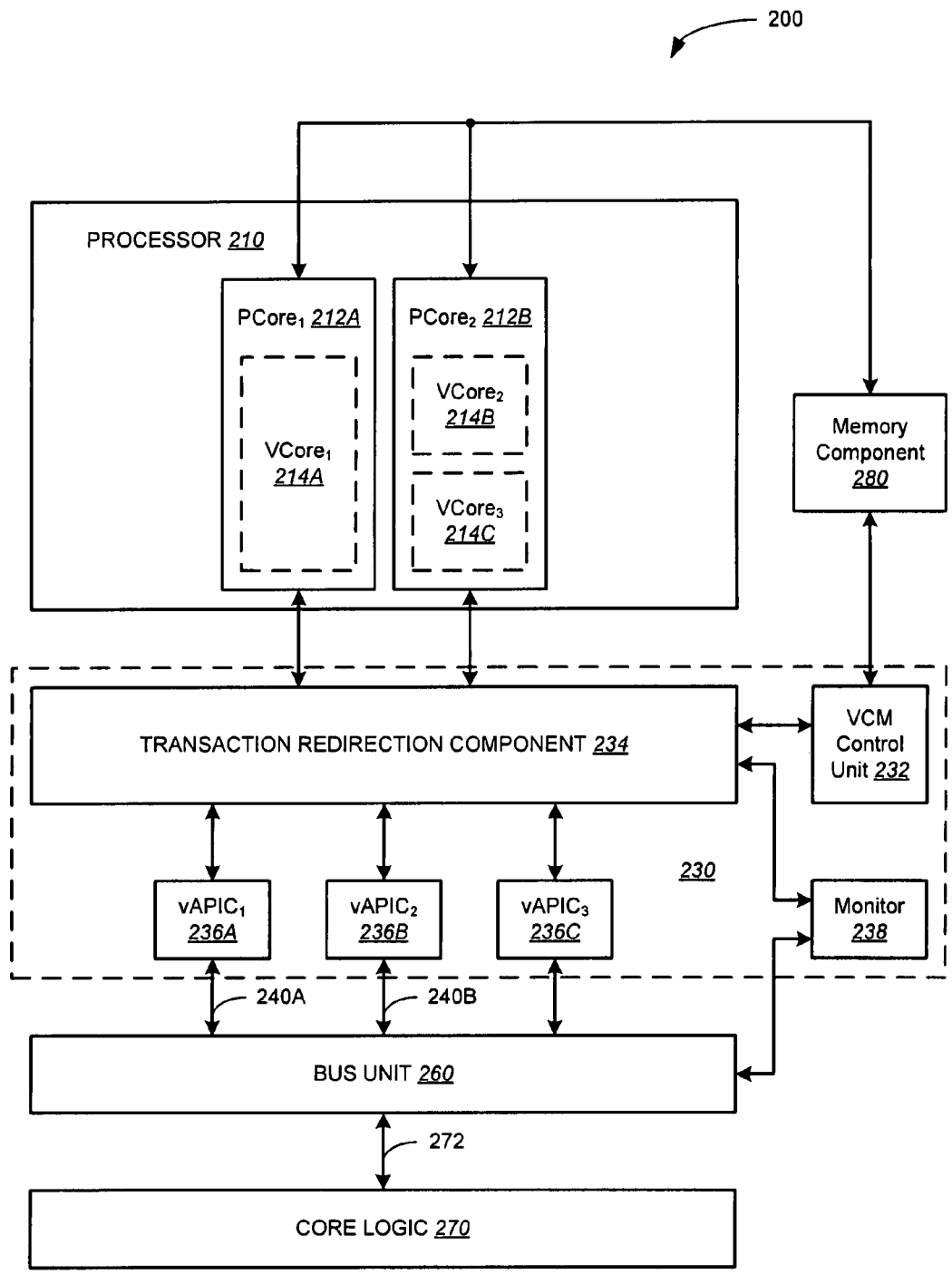

In one embodiment, as shown in FIG. 2F, processor core complex 210 may be adapted to comprise a plurality of PCores 212A, 212B. VCM control unit 232 may be adapted to map first VCore 214A to first PCore 212A and map second and third VCores 214B and 214C to second PCore 212B. In one example of processor core complex 210, VCM control unit 232 may be adapted to map a single VCore, such as first VCore 214A, to first PCore 212A and map a plurality of VCores, such as second and third VCores 214B and 214C, to second PCore 212B. As shown in FIG. 2F, VCores 214A, 214B and 214C are adapted to have corresponding vAPICs 236A, 236B and 236C, respectively, which are adapted to accept and process transactions received from bus unit 260 and transfer transactions via TRC 234 to VCores 214A, 214B and 214C, respectively. Hence, in one example, processor core complex 210 may comprise a number of VCores, such as VCores 214A, 214B, 214C, that is greater than the number of PCores, such as PCores 212A, 212B. In one example, VCM control unit 232 assigns vAPIC 236A to VCore 214A, which resides on PCore 212A, vAPIC 236B to VCore 214B, which resides on PCore 212B, and vAPIC 236C to VCore 214C, which resides on PCore 212B, and coordinates the transfer of transactions from vAPICs 236A, 236B and 236C to VCores 214A, 214B and 214C, respectively.

Figure 2G:
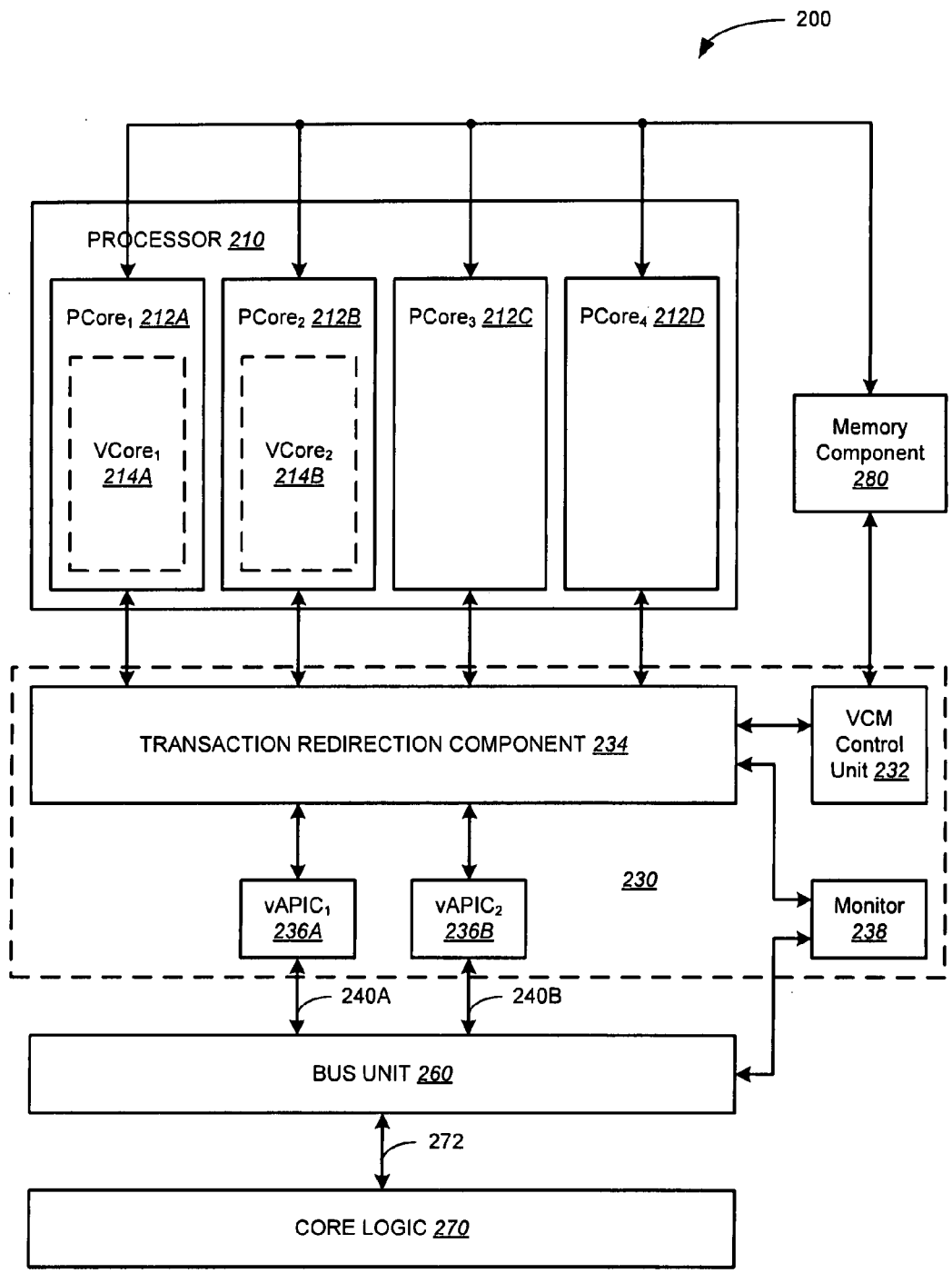

In one embodiment, as shown in FIG. 2G, processor core complex 210 may be adapted to comprise a plurality of PCores 212A, 212B, 212C, 212D. VCM control unit 232 may be adapted to map first VCore 214A to first PCore 212A, map second VCore to second PCore 212B, and not map VCores to third and fourth PCores 212C and 212D. In one example of processor core complex 210, VCM control unit 232 may be adapted to map a single VCore, such as first VCore 214A, to first PCore 212A, map a single VCore, such as VCore 214B, to second PCore 212B, and leave third and fourth PCores 212C, 212D without any VCore mapping, as shown in FIG. 2G. Hence, in one example, processor core complex 210 may comprise a number of VCores, such as VCores 214A, 214B, that is less than the number of PCores, such as PCores 212A, 212B, 212C, 212D.

As shown in FIG. 2G, VCores 214A and 214B are adapted to have corresponding vAPICs 236A and 236B, respectively, which are adapted to accept and process transactions received from bus unit 260 and transfer transactions via TRC 234 to VCores 214A and 214B, respectively. In one example, VCM control unit 232 assigns vAPIC 236A to VCore 214A, which resides on PCore 212A, and vAPIC 236B to VCore 214B, which resides on PCore 212B, and coordinates the transfer of transactions from vAPICs 236A and 236B to VCores 214A and 214B, respectively.

Figure 2H:
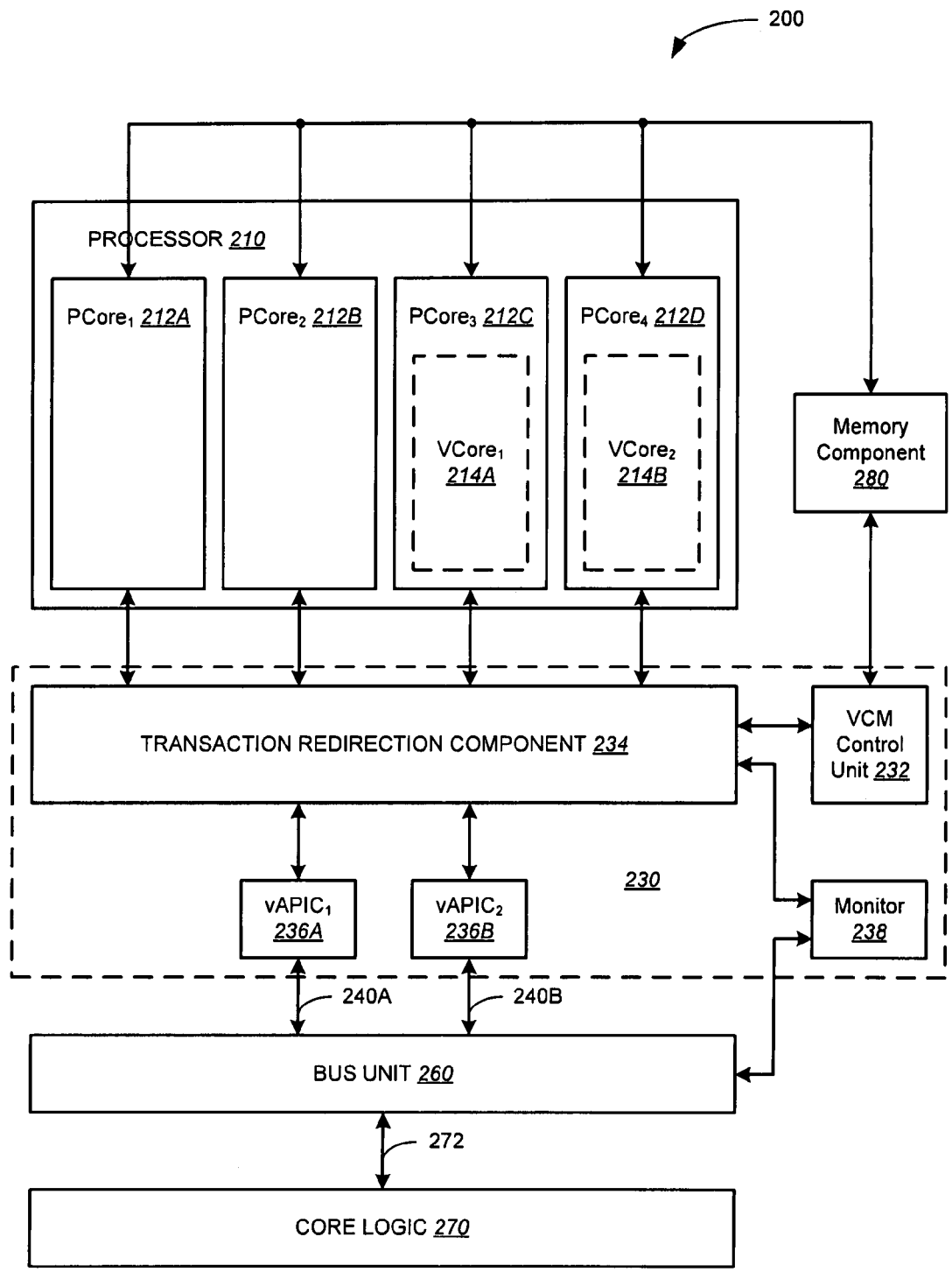

In one embodiment, as shown in FIG. 2H with reference to FIG. 2G, first and second VCores 214A, 214B may be remapped from first and second PCores 212A, 212B, as shown in FIG. 2G, to third and fourth PCores 212C, 214D. In one example, VCM control unit 232 assigns vAPIC 236A to VCore 214A, which resides on PCore 212C, and vAPIC 236B to VCore 214B, which resides on PCore 212D, and coordinates the transfer of transactions from vAPICs 236A and 236B to VCores 214A and 214B, respectively.

In one embodiment, processor core complex 210 may be adapted to comprise a plurality of PCores, such as four PCores, and VCM control unit 232 may be adapted to map a VCore to each of the four PCores. In one example, each VCore is assigned a corresponding vAPIC such that there are four vAPICs, which are adapted to accept and process transactions received from bus unit 260 and transfer transactions via TRC 234 to each VCore.

In view of the above discussion, it should be appreciated that processor core complex 210 may comprise any number of PCores, any number of VCores and any number of vAPICs in any combination thereof without departing from the scope of the present disclosure. Further scope and discussion of PCores, VCores and vAPICs will be provided in greater detail herein.

In various embodiments, as will be discussed in greater detail herein, each PCore 212A-212M may comprise a high performance core or a low power core. In general, a high performance core is adapted for high performance processing at the cost of a higher power usage, and the low power core is adapted for lower power usage at the cost of lower performance processing.

In one implementation, with reference to FIGS. 2D to 2F, one of the two PCores may comprise a high performance core and one of the two PCores may comprise a low power core. In another implementation, with reference to FIGS. 2G to 2H, two of the four PCores may comprise high performance cores and two of the four PCores may comprise low power cores. In still another implementation, three of the four PCores may comprise high performance cores and one of the four PCores may comprise a low power core. However, it should be appreciated that any number of PCores may be utilized in VCM system 200 with any number of PCores being high performance cores and any number of PCores being low power cores without departing from the scope of the present disclosure.

Embodiments of the present disclosure provide systems and methods for detecting various conditions that may trigger VCore mapping, unmapping, and/or remapping from one PCore to another PCore including intercepting OS performance state requests, such as OS P-state and OS C-state requests, and storing one or more VCores in a memory component using the VCM component.

Figure 3A:
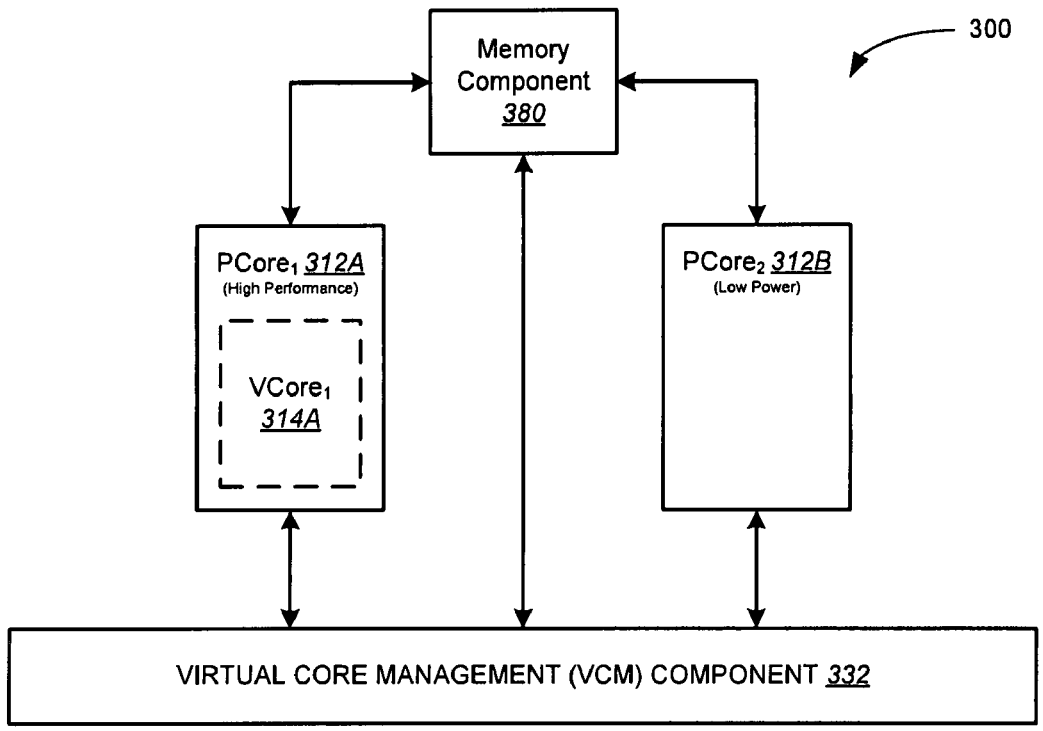
FIGS. 3A-3D show various embodiments of moving a virtual core (VCore) from one physical core (PCore) to another PCore.
Figure 3B:
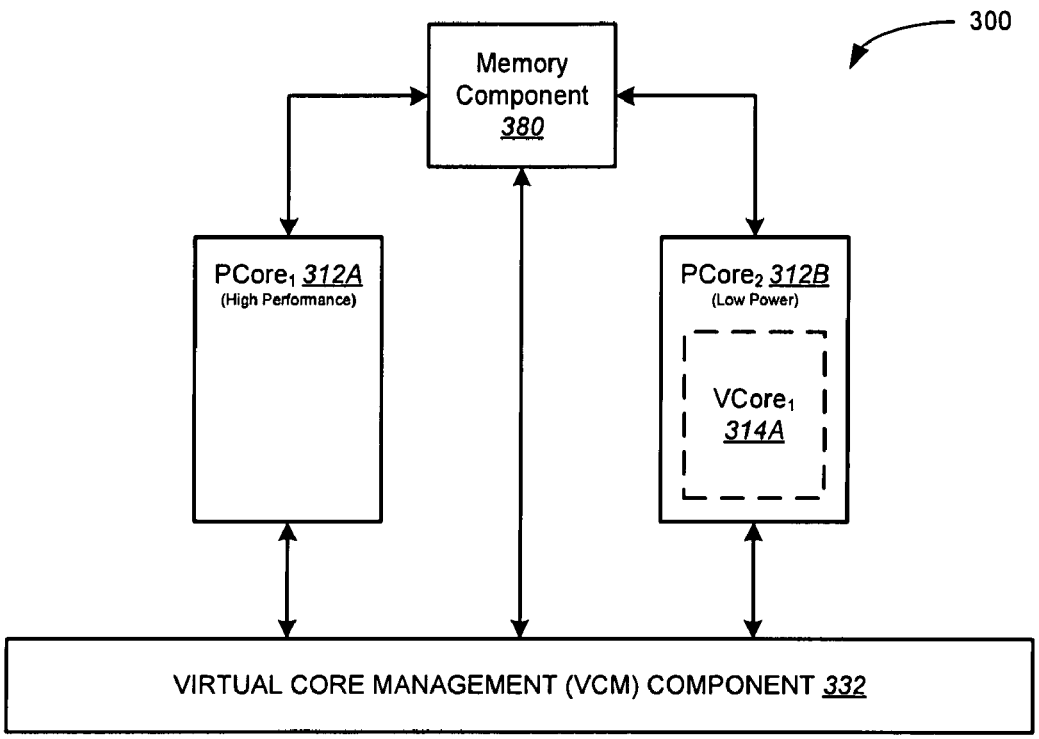

FIGS. 3A and 3B show an embodiment of remapping a VCore from a first PCore to a second PCore in response to a performance state request from an OS. FIG. 3A shows one embodiment of a VCM system 300 having a plurality of PCores 312A and 312B, a VCM component 332 and a memory component 380. As shown in FIG. 3A, first PCore 312A comprises a high performance PCore, second PCore 312B comprises a low power PCore, and VCore 314A is mapped to first PCore 312A by VCM component 332 for high performance operation. FIG. 3B shows VCM system 300 of FIG. 3A with VCore 314A mapped to second PCore 312B by VCM component 332 for low power operation.

In one implementation of FIG. 3A, VCM component 332 is adapted to map VCore 314A to first PCore 312A for high performance operation. In response to a low power state request from the OS, VCM component 332 is adapted to remap VCore 314A to second PCore 312B for low power operation, as shown in FIG. 3B. In one example, this remapping may be achieved by storing one or more logical states of VCore 314A from first PCore 312A in memory component 380, unmapping VCore 314A from first PCore 312A, mapping VCore 314A to second PCore 312B, and then transferring the one or more stored logical states of VCore 314A to second PCore 312B. In other words, this remapping may be achieved by copying one or more logical states of VCore 314A residing in first PCore 312A to memory component 380, and mapping VCore 314A to second PCore 312B by transferring the one or more logical states of VCore 314A stored in memory component 380 to second PCore 312B. In one embodiment, the unmapping of VCore 314A from first PCore 312A may be done in parallel with the transferring.

Alternately, in another implementation, in response to a high performance state request from the OS, VCM component 332 is adapted to remap VCore 314A to first PCore 312A for high performance operation, as shown in FIG. 3A. In one example, this remapping may be achieved by storing one or more logical states of VCore 314A from second PCore 312B in memory component 380, unmapping VCore 314A from second PCore 312B, mapping VCore 314A to first PCore 312A, and transferring the one or more stored logical states of VCore 314A to first PCore 312A. In other words, this remapping may be achieved by copying one or more logical states of VCore 314A residing in second PCore 312B to memory component 380, and remapping VCore 314A to first PCore 312A by transferring the one or more logical states of VCore 314A stored in memory component 380 to second PCore 312B. The unmapping of VCore 314A from second PCore 312B may be done in parallel with the remapping.

Referring to FIGS. 3A and 3B, in response to a low power state request or a high performance state request, VCM component 332 is adapted to remap a VCore from one PCore to another PCore for purposes of low power operation or high performance operation, whichever state request is requested by the OS. As discussed herein, VCM component 332 facilitates the remap of a VCore from one PCore to another PCore.

Figure 3C:
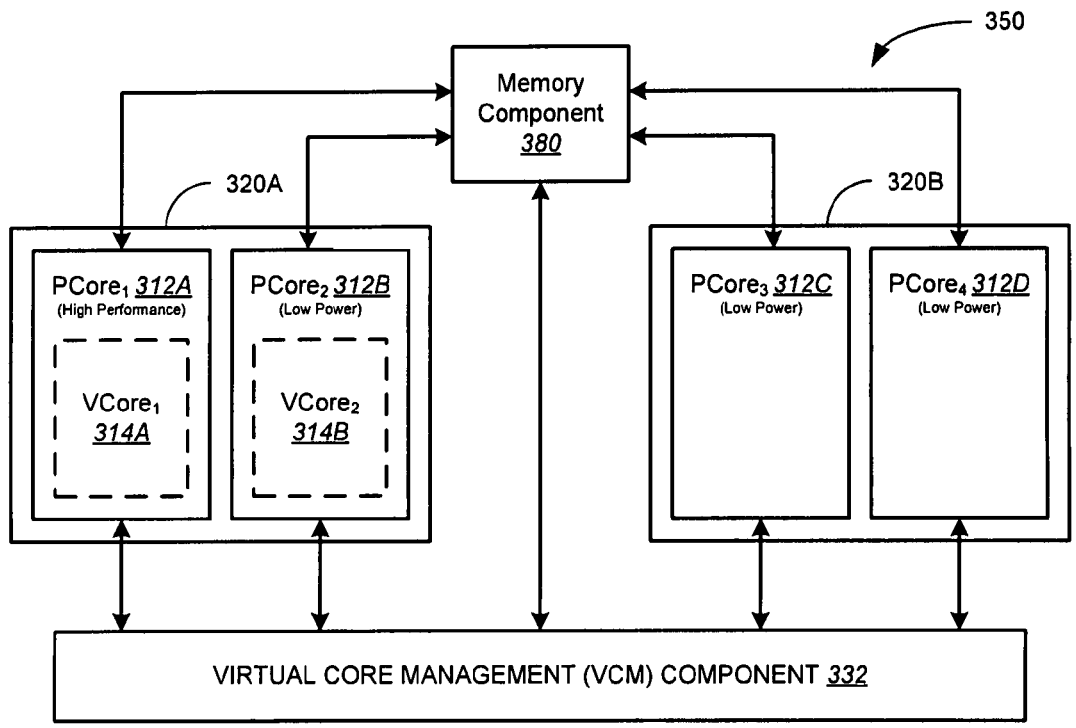
Figure 3D:
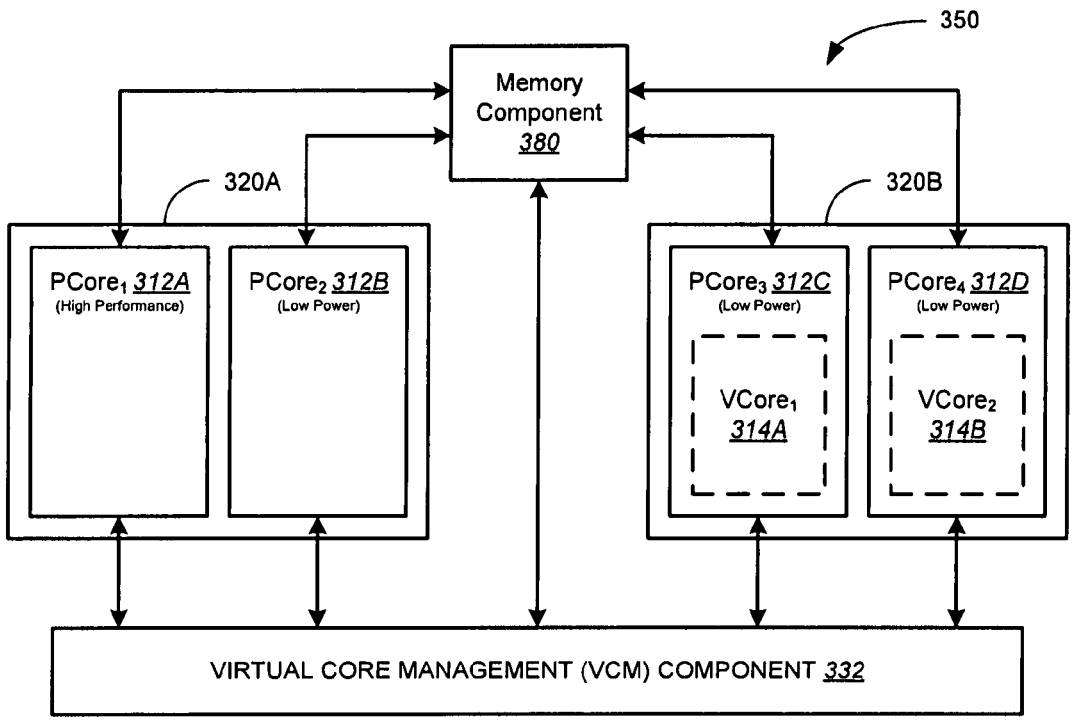

FIGS. 3C and 3D show another embodiment of remapping a plurality of VCores from a first plurality of PCores to a second plurality of PCores in response to a performance state request from an OS.

FIG. 3C shows one embodiment of a VCM system 350 having a plurality of PCores 312A-312D, VCM component 332 and memory component 380. As shown in FIG. 3C, first and second PCores 312A, 312B comprise high performance PCores, third and fourth PCores 312C, 312D comprise low power PCores, and first and second VCores 314A, 314B are mapped to first and second PCores 312A, 312B, respectively, by VCM component 332. FIG. 3D shows VCM system 350 of FIG. 3C with first and second VCores 314A, 314B mapped to third and fourth PCores 312C, 312D, respectively, by VCM component 332. In one example, first and second PCores 312A, 312B comprise a first core pair complex (CPC) 320A, and third and fourth PCores 312C, 312D comprise a second CPC 320B.

In one implementation of FIG. 3C, VCM component 332 is adapted to map first and second VCores 314A, 314B to first and second PCores 312A, 312B, respectively, for high performance operation. In response to a low power state request from the OS, VCM component 332 is adapted to remap VCores 314A, 314B to third and fourth PCores 312C, 312D for low power operation, as shown in FIG. 3D. In one example, this remapping may be achieved by storing one or more states of VCores 314A, 314B from first and second PCores 312A, 312B in memory component 380, unmapping VCores 314A, 314B from first and second PCores 312A, 312B, mapping VCores 314A, 314B to third and fourth PCores 312C, 312D, and then transferring the one or more stored states of VCores 314A, 314B to third and fourth PCores 312C, 312D, respectively.

Alternately, in another implementation, in response to a high performance state request from the OS, VCM component 332 is adapted to remap VCores 314A, 314B to first and second PCores 312A, 312B for high performance operation, as shown in FIG. 3A. In one example, this remapping may be achieved by storing one or more logical states of VCores 314A, 314B from third and fourth PCores 312C, 312D in memory component 380, unmapping VCores 314A, 314B from third and fourth PCores 312C, 312D, mapping VCores 314A, 314B to first and second PCores 312A, 312B, and then transferring the one or more stored logical states of VCores 314A, 314B to first and second PCores 312A, 312B, respectively.

Referring to FIGS. 3C and 3D, in response to a low power state request or a high performance state request, VCM component 332 is adapted to remap one or more VCores from one or more PCores to one or more other PCores in any order for purposes of low power operation or high performance operation, whichever state request is requested by the OS.

Figure 4A:
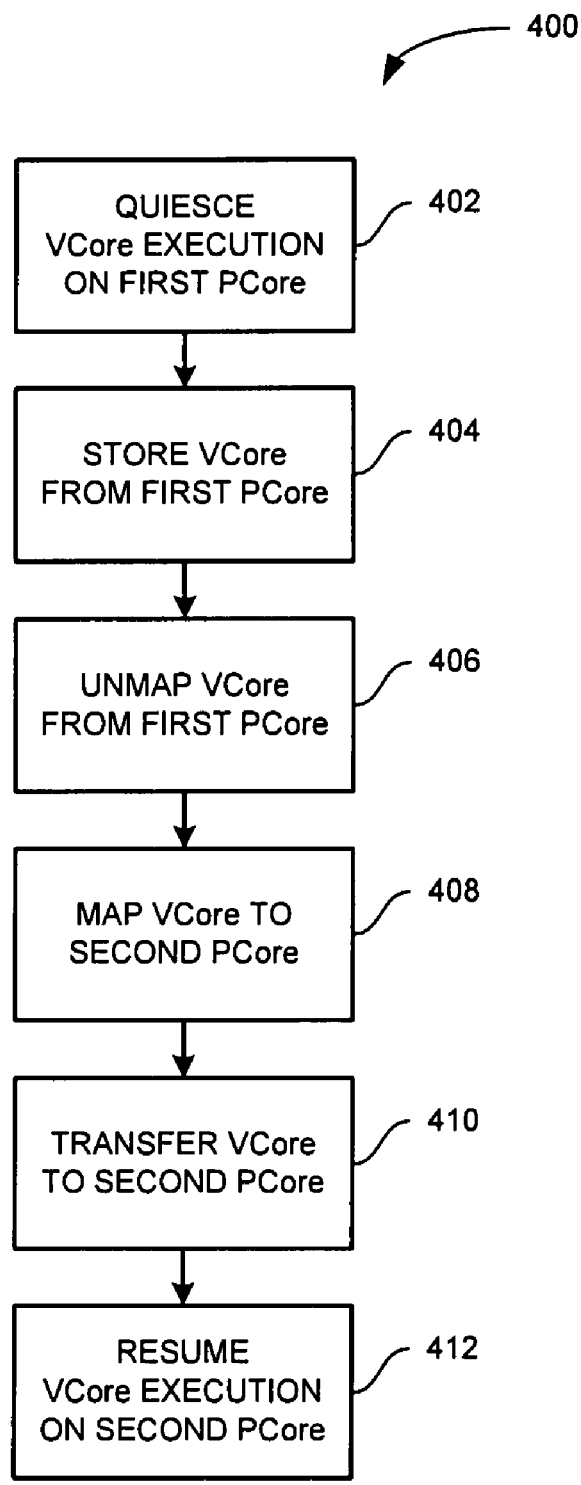
FIG. 4A shows a block diagram illustrating a method for moving a VCore from one PCore to another PCore in accordance with an embodiment of the present disclosure.

FIG. 4A shows one embodiment of a block diagram illustrating a method 400 for remapping a VCore from one PCore to another PCore, with reference to FIGS. 3A-3D. It should be appreciated that method 400 of FIG. 4A may be applied to any embodiments of FIGS. 1A thru 2H and related components thereof without departing from the scope of the present disclosure.

In one embodiment, referring to FIGS. 3A, 3B and 4A, VCM component 332 is adapted to quiesce (e.g., halt or enter into a temporary inactive state) execution of VCore 314A on first PCore 312A (block 402) by, in one example, causing PCore 312A to complete execution of one instruction and then not start the execution of a next instruction. Next, VCM component 332 is adapted to store one or more logical states of VCore 314A from first PCore 312A in memory component 380 (block 404) and unmap VCore 314A from first PCore 312A (block 406). Next, VCM component 332 is adapted to map stored VCore 314A to second PCore 312B (block 414) and transfer the one or more stored logical states of VCore 314A stored in memory component 380 to second PCore 312B (block 416), as shown in FIG. 3B. Following the transfer, VCM component 332 is adapted to resume execution of VCore 314A on second PCore 312B (block 420). As an option, VCM component 332 is adapted to optionally power-down first PCore 312A to conserve power after VCore 314A is unmapped from first PCore 312A (block 406).

In view of the above discussion, it should be appreciated that the above discussion represents one implementation of remapping a VCore from one PCore to another PCore, and thus various other embodiments may be considered applicable in reference to embodiments presented in any figures discussed herein. Hence, in one example, method 400 of FIG. 4A may be similarly implemented to VCM system 350 of FIGS. 3C and 3D without departing from the scope of the present disclosure.

Figure 4B:
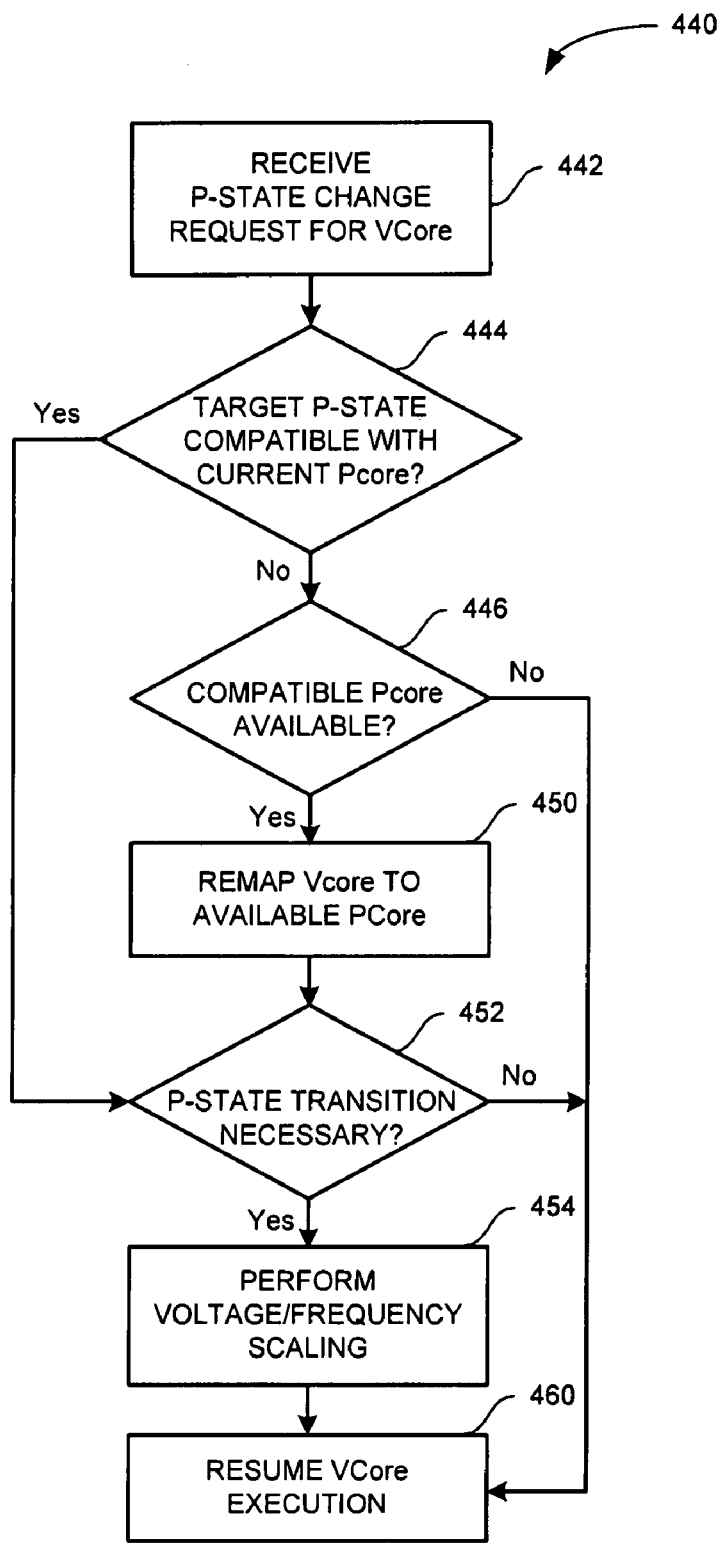
FIG. 4B shows a block diagram illustrating a method for processing performance management (P-state) requests in accordance with an embodiment of the present disclosure.

FIG. 4B shows one embodiment of a block diagram illustrating a method 440 for processing performance management requests (e.g., intercepting OS P-state requests) with reference to FIGS. 3A-3D and method 400 of FIG. 4A. It should be appreciated that method 440 of FIG. 4B may be applied to any embodiments of FIGS. 1A thru 2H and related components thereof without departing from the scope of the present disclosure.

In one embodiment, referring to FIG. 4B, VCM component 332 is adapted to receive a VCore P-state change request for a lower or higher target P-state (i.e., performance state) of the VCore from an OS (block 442). VCM component 332 determines if the target performance (e.g., as defined by the P-state) of the VCore is within the range of operation of (i.e., compatible with) the current PCore (block 444). If not, VCM component 332 determines if a compatible PCore for the target P-state of the VCore is available. If not, VCM component 332 may be adapted to either wait for the availability of a compatible PCore or resume VCore execution on the current PCore (block 460). If a compatible PCore is available, then VCM component 332 is adapted to remap the VCore to the available PCore (block 450) in a manner, for example, as discussed in reference to method 400 of FIG. 4A.

Otherwise, if VCM component 332 determines that the target P-state of the VCore is compatible with the current PCore (block 444), then VCM component 332 determines if a P-state transition of the current PCore is necessary for implementing the target P-state of the VCore (block 452). If so, then VCM component 332 performs voltage and/or frequency scaling on the current PCore (block 454), and VCM component 332 resumes VCore execution on the scaled PCore (block 460). Otherwise, if not, then VCM component 332 resumes VCore execution on the unscaled PCore (block 460).

In one implementation of method 440 of FIG. 4B, an OS issues ACPI (Advanced Configuration and Power Interface) P-state requests through model-specific registers (MSRs). Microcode for x86 instructions (rdmsr/wrmsr) that access these MSRs may be modified to check if the accesses are for P-state transition. If so, this microcode may inform VCM component 332 to take VCM action by dynamically remapping a running thread onto another PCore based on performance demand.

In general, ACPI (Advanced Configuration and Power Interface) is an open industry specification that establishes industry-standard interfaces enabling OS-directed configuration, power management and thermal management of mobile, desktop and server platforms. The present disclosure enables power management technologies to evolve independently in operating systems and hardware while ensuring that they continue to work together.

In one aspect, by using different transistor sizes, different voltage, different frequencies and different circuit techniques, a PCore may be optimized for low power or for high performance, but not both. A symmetric or asymmetric multi-core processor may comprise one or more PCores optimized for low power and one or more PCores optimized for high performance.

In one implementation, ACPI performance state transitions may be extended so that when the OS requests a VCore to transition from a high performance state to a low performance state, in addition to the traditional voltage/frequency scaling that would be done for performance state transition, VCM component 332 may remap a VCore to a lower performance core with lower power consumption. Alternately, if the OS requests a VCore to transition from a low performance state to a high performance state, VCM component 332 may remap the VCore to a higher performance PCore.

In another implementation, the ACPI CPU state (C-state) transition may be extended so that when the OS requests a VCore to transition into a lower power C-state (e.g., idle power management state), in addition to the traditional clock gating and/or lowering of the voltage to the PCore to which the VCore is mapped, VCM component 332 may save one or more logical states of the VCore from the PCore to which the VCore is mapped in memory component 380, which may, for example, be hidden from the OS, and unmap the VCore from the PCore. VCM component 332 may then decide to either power down the PCore or map another VCore to the PCore.

In one embodiment, if VCM component 332 decides to remap a VCore from a source PCore to a destination PCore, the microcode running on the source PCore is adapted to store one or more logical states of the VCore from the source PCore in memory, such as memory component 380. The microcode running on the destination PCore may then be used by VCM component 332 to transfer the one or more stored logical states of the VCore from memory component 380 to the destination PCore for operation of the VCore.

Figure 4C:
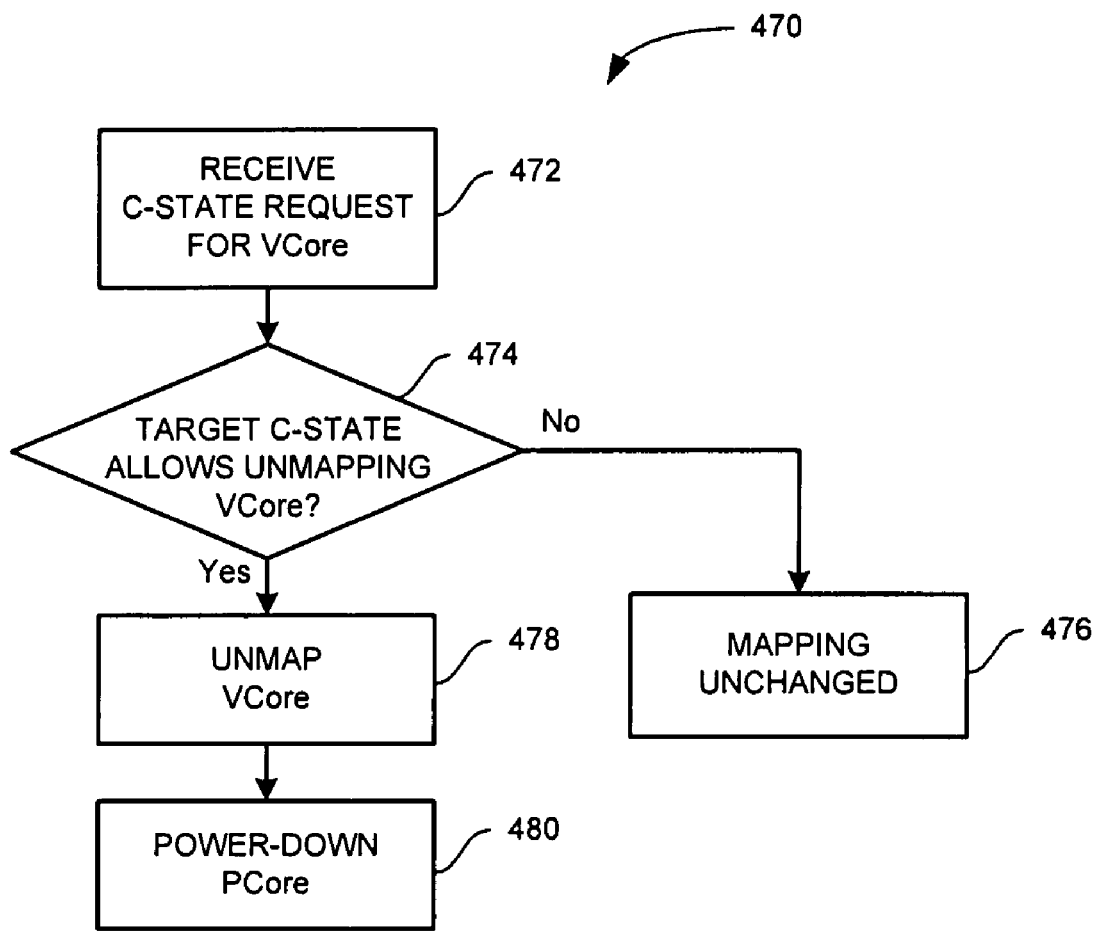
FIG. 4C shows a block diagram illustrating a method for processing idle power management (C-state) requests in accordance with an embodiment of the present disclosure.

FIG. 4C shows one embodiment of a block diagram illustrating a method 470 for processing idle power management (C-state) requests (e.g., intercepting OS C-state requests) with reference to FIGS. 3A-3D and method 400 of FIG. 4A. It should be appreciated that method 470 of FIG. 4C may be applied to any embodiments of FIGS. 1A thru 2H and related components thereof without departing from the scope of the present disclosure.

In one implementation, an OS issues ACPI C-state requests through an IO port read, and VCM component 332 is adapted to receive C-state requests for idle power management from an OS (block 472). In one embodiment, the microcode for the x86 IN instruction may be modified by the VCM component 332 to determine whether the IO port read is requesting initiation of a C-state transition by unmapping a VCore from a source PCore (block 474). If so, the microcode running on the source PCore may inform VCM component 332 to store one or more logical states of the VCore from the source PCore in memory component 380, and unmap the VCore from the source PCore (block 478), and then VCM component 332 may power-down the source PCore (block 480). Otherwise, if not, then VCM component 332 is adapted to maintain the mapping of the VCore on the source PCore (block 476).

In various implementations, virtual core management may include power management considerations. The VCM component may unmap a virtual core from a physical core in response to the virtual core being put into a sleep state (e.g., by ACPI). In one example, the VCM component may lower the PCore voltage to zero or some other voltage to reduce the power consumption of the unmapped PCore. The VCM component may associate a virtual core with a high-performance physical core when high performance is required. The VCM component may associate a virtual core with a low-power physical core when high performance is not required. The VCM component may associate a virtual core with a low-power physical core when low power consumption, low-voltage operation, or high energy efficiency is desirable.

In various implementations, virtual core management may include idle detection considerations. In one example, the VCM component may unmap a virtual core from a first physical core and map a second virtual core to the first physical core in response to detecting that the first physical core is idle and the second virtual core is ready to begin executing instructions. In another example, the VCM component may unmap a virtual core from a physical core in response to detecting the execution of an instruction that will cause the physical core to be idle for some length of time. This may include an input or output instruction that is executed by performing the input or output request, waiting for the input or output request to be acknowledged by the input or output device, and/or performing steps in response to an acknowledgement.

Figure 5:
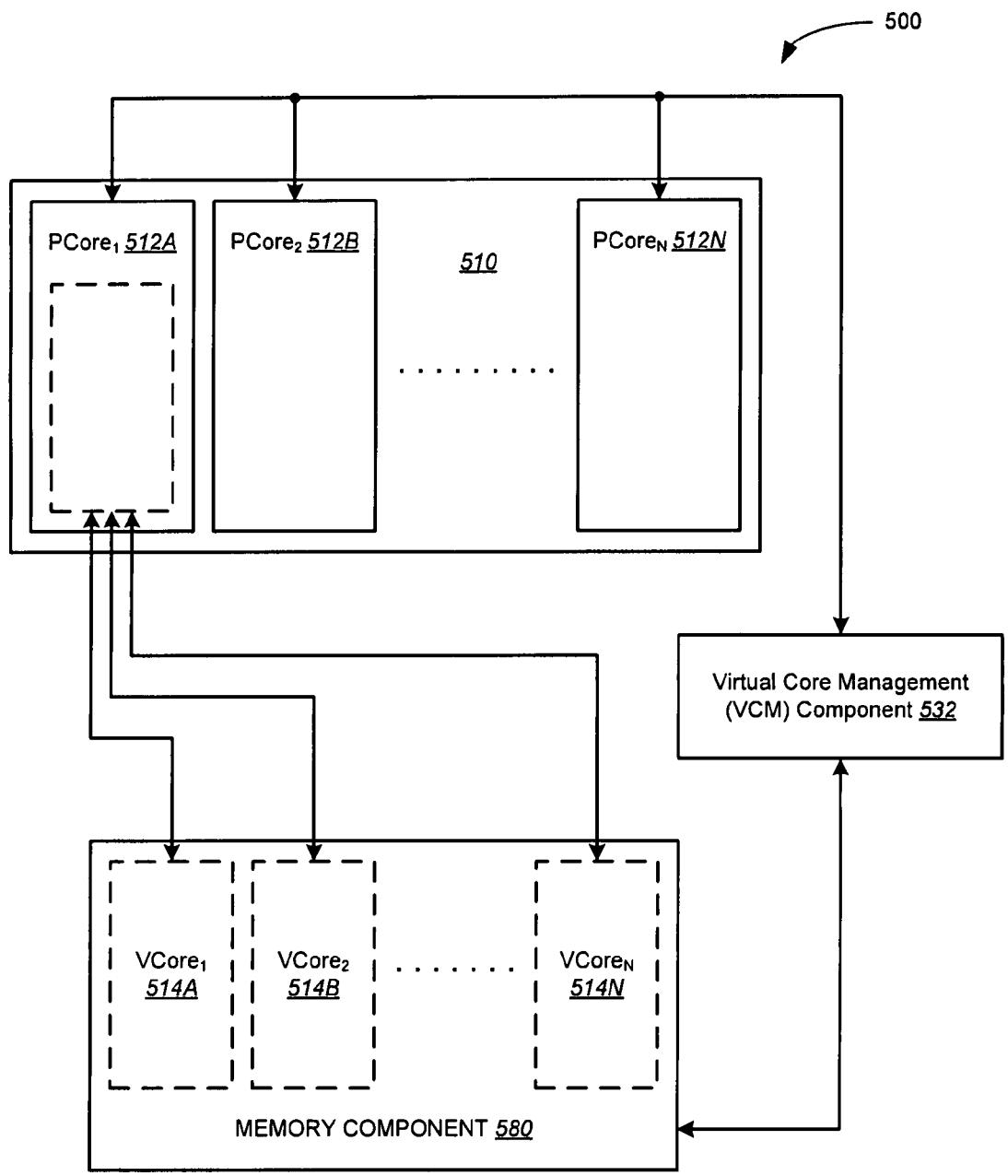
FIG. 5 shows a block diagram illustrating physical core time-sharing in a VCM system in accordance with an embodiment of the present disclosure.

FIG. 5 shows one embodiment of a block diagram illustrating physical core time-sharing in a VCM system 500 having a processor core complex 510 (including one or more PCores 512A-512M) and one or more VCores 514A-514N alternately mapped to a first PCore 512A. It should be appreciated that first PCore 512A may be configured to run (e.g., operate) any number of VCores 514A-514N, without PCore 512A necessarily being a multi-threaded physical core and without departing from the scope of the present disclosure. Also, in various embodiments, it should be appreciated that any number of VCores 514A-514N, may be simultaneously mapped to a single physical core, such as first PCore 512A or any other single PCore 512B-512M if, in one implementation, PCore 512A is a multi-threaded physical core, without departing from the scope of the present disclosure.

In one embodiment, time-sharing of multiple VCores 514A-514N on one PCore 512A may be implemented in a computing system, such as VCM system 500, for power saving capability. In one example, a first VCore 514A may be mapped to PCore 512A. In response to a service interrupt, such as, for example, an OS C-state request, first VCore 514A may be unmapped from PCore 512A when putting first VCore into an idle power management state. Once first VCore 514A is unmapped from first PCore 512A, a second VCore 514B may be mapped to first PCore 514A and/or a third VCore 514B may be mapped to first PCore 514A to perform an operation, task and/or thread, such as, for example, servicing transactions including interrupts.

Referring to FIG. 5, VCM component 532 may be adapted to manage and coordinate the mapping and unmapping of a plurality of VCores 514A, 514B, 514C between first PCore 512A and memory component 580 in response to transactions, such as, for example, interrupts, and P-state and C-state management requests. In one example, VCores 514A, 514B, 514C may be stored on memory component 580 for mapping to PCore 512A by VCM component 532.

In one embodiment of FIG. 5, VCM component 532 may be adapted to alternately map a plurality of VCores 514A to VCore 514N to a single PCore 512A. In an original state, for example, VCores 514A, 514B, 514C may have been respectively mapped to corresponding PCores 512A, 512B, 512C. In another state, during a power saving mode of operation, for example, VCM component 532 may have stored VCores 514A, 514B, 514C to memory component 580 and then alternately mapped VCores 514A, 514B, 514C to first PCore 512A to service transactions and then power down second and third PCores 512B, 512C to save (e.g., conserve) power in VCM system 560.

In one implementation, referring to FIG. 5, VCM component 532 may be adapted to separately map each of a plurality of VCores 514A, 514B, 514N to a single PCore 512A in an alternating manner. In another implementation, referring to FIG. 5, VCM component 532 may be adapted to simultaneously map each of a plurality of VCores 514A, 514B, 514N to a single PCore 512A, if the PCore is a multi-threaded physical core.

In one embodiment, when a multi-core processor is relatively idle, one or more of the physical cores in a multi-core processor may wake up periodically for a short amount of time to service transactions or perform various other types of tasks, instructions and/or threads. A VCM system of the present disclosure allows virtual cores to time-share a single or any number of physical cores, so that other physical cores may be turned off without having to wake up periodically to service transactions. In various examples, this power saving feature of the present disclosure allows a single physical core to service transactions originally mapped to other physical cores that may be powered down. It should be appreciated that the above discussion represents one implementation of a power saving mode of operation, and thus various other embodiments may be considered applicable in reference to embodiments presented in any figures discussed herein.

Figure 6:
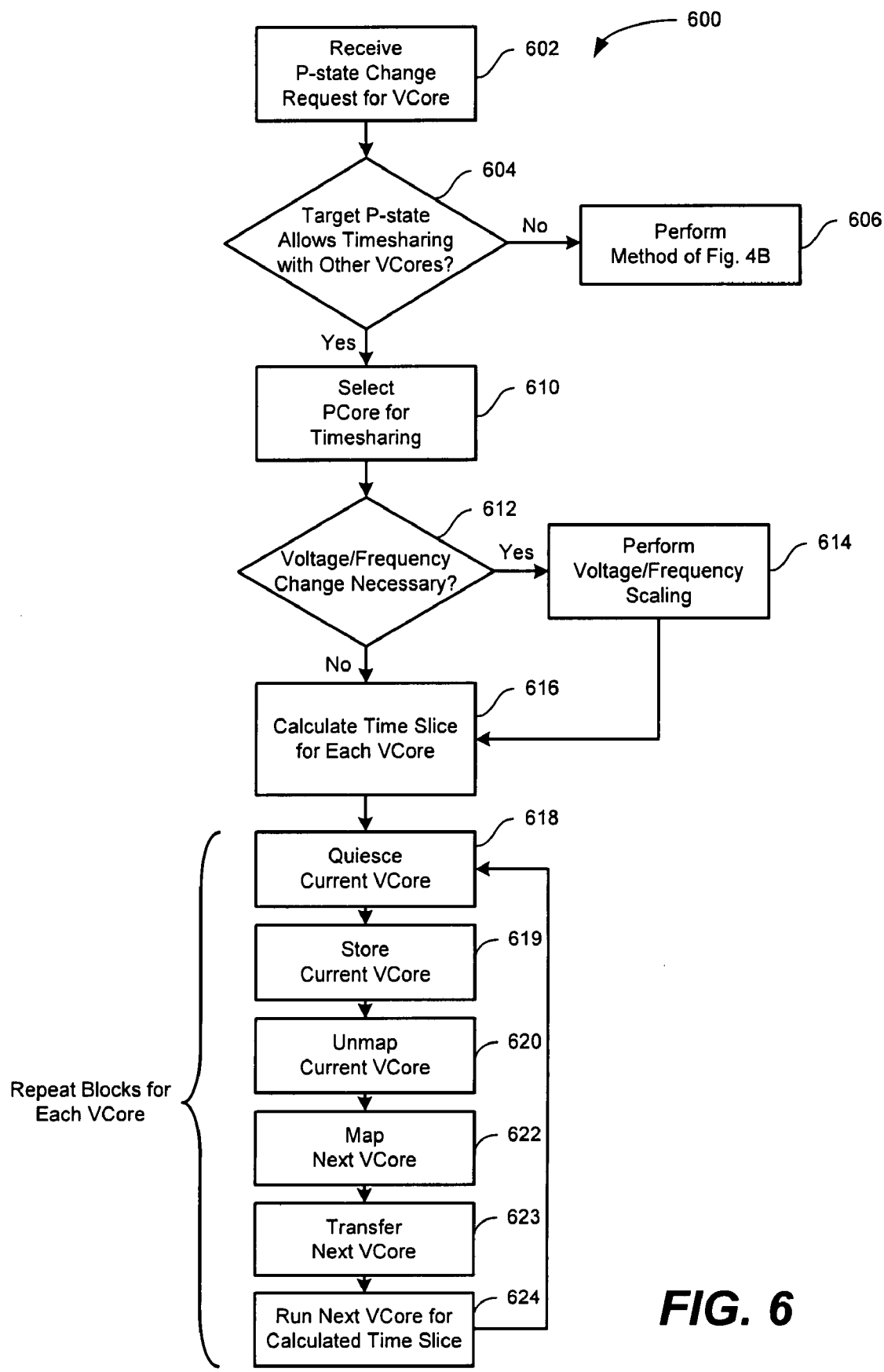
FIG. 6 shows a block diagram illustrating a method for physical core time-sharing and processing service interrupts in accordance with an embodiment of the present disclosure.

FIG. 6 shows one embodiment of a block diagram illustrating a method 600 for physical core time-sharing and processing service interrupts, such as, for example, P-state requests and C-state performance management requests, with reference to FIG. 5. It should be appreciated that method 600 of FIG. 6 may be applied to any embodiments of FIGS. 1A thru 2H and related components thereof without departing from the scope of the present disclosure.

In one embodiment, referring to FIGS. 5 and 6, VCM component 532 is adapted to receive (e.g., sense) a service interrupt request, such as a P-state change request for reduced power consumption, from an OS (block 602). VCM component 532 is adapted to determine whether the target P-state (e.g., performance state) allows time-sharing of VCores 514A-514N, which may be used to conserve power (block 604) of VCM system 500. If not, VCM component 532 may be adapted to perform the method 440 of FIG. 4B to process performance management requests (block 606). Otherwise, if yes, then VCM component 532 is adapted to select a PCores 512A-512M for time-sharing one or more VCores 514A-514N (block 610). Next, VCM component 532 is adapted to determine if a voltage and/or frequency change of the selected PCore is necessary to time share the one or more VCores (block 612). If yes, then VCM component performs voltage and/or frequency scaling on the selected PCore (block 614). In various implementations, the voltage and/or frequency scaling may be performed at any time. Next, VCM component 532 calculates a time slice for each of the one or more VCores assigned to time share on the selected PCore (block 616). Alternately, if voltage and/or frequency scaling is not necessary (block 612), the VCM component 532 calculates the time slice for each of the one or more VCores assigned to time share on the selected PCore (block 616).

Next, in one embodiment, VCM component 532 is adapted to quiesce a current VCore on the selected PCore (block 618) and store one or more logical states of the current VCore in the memory component (block 619). VCM component 532 is adapted to unmap the current VCore from the selected PCore (block 620), map a next VCore to the selected VCore (block 622), transfer one or more logical states of the next VCore from memory (block 623), and run the next VCore on the selected PCore for the calculated time slice of that particular VCore (block 624). Next, VCM component 532 is adapted to rotate VCore execution on the selected PCore in a time-sharing manner by repeating 630 one or more of the previous actions of blocks 618 thru 624.

It should be appreciated that one or more unused PCores may be powered down to conserve power. It should also be appreciated that one or more actions of method 400 of FIG. 4A may be utilized by VCM component 532 to rotate execution of VCores on the selected PCore. It should also be appreciated that any of PCores 512A-512M may be used as a single PCore to rotate execution of one or more VCores 514A-514N. It should also be appreciated that the above discussion represents one implementation of a physical time-sharing mode of operation for power conservation, and thus various other embodiments may be considered applicable for various other types of functions in reference to embodiments presented in any figures discussed herein.

In various implementations, virtual core management may include timesharing considerations. In one implementation, the VCM component may alternately map a first virtual core and a second virtual core onto a single physical core based on fixed time intervals, wherein these time intervals may be based on the ACPI P-state settings associated with the physical cores. For example, if two virtual cores are being time-shared on a physical core running at 1,500 MHz, and the first virtual core has a P-state requesting 600 MHz operation and the second virtual core has a P-state requesting 800 MHz operation, then the first virtual core may execute for $^{600}/_{1500}$ths of the basic time interval and the second virtual core may execute for $^{800}/_{1500}$ths of the basic time interval. In another example, these time intervals may be based on observing execution characteristics as measured by performance counters.

In another implementation, the VCM component may alternately map a first virtual core and a second virtual core onto a single physical core in response to having more virtual cores that are ready to begin executing instructions than physical cores that are available, having more virtual cores that are ready to begin executing instructions than physical cores that can be active within the current limits of power consumption, and/or having multiple virtual cores that are currently processing software threads that require the same data to optimize cache efficiency.

In various implementations, virtual core management may include coherency management considerations. In one example, the VCM component may select a virtual core to map onto a physical core based on data locality, wherein the VCM component may determine that a virtual core is executing instructions, and that the virtual core needs data already present in caches of a physical core. This may be based on historical data.

Figure 7A:
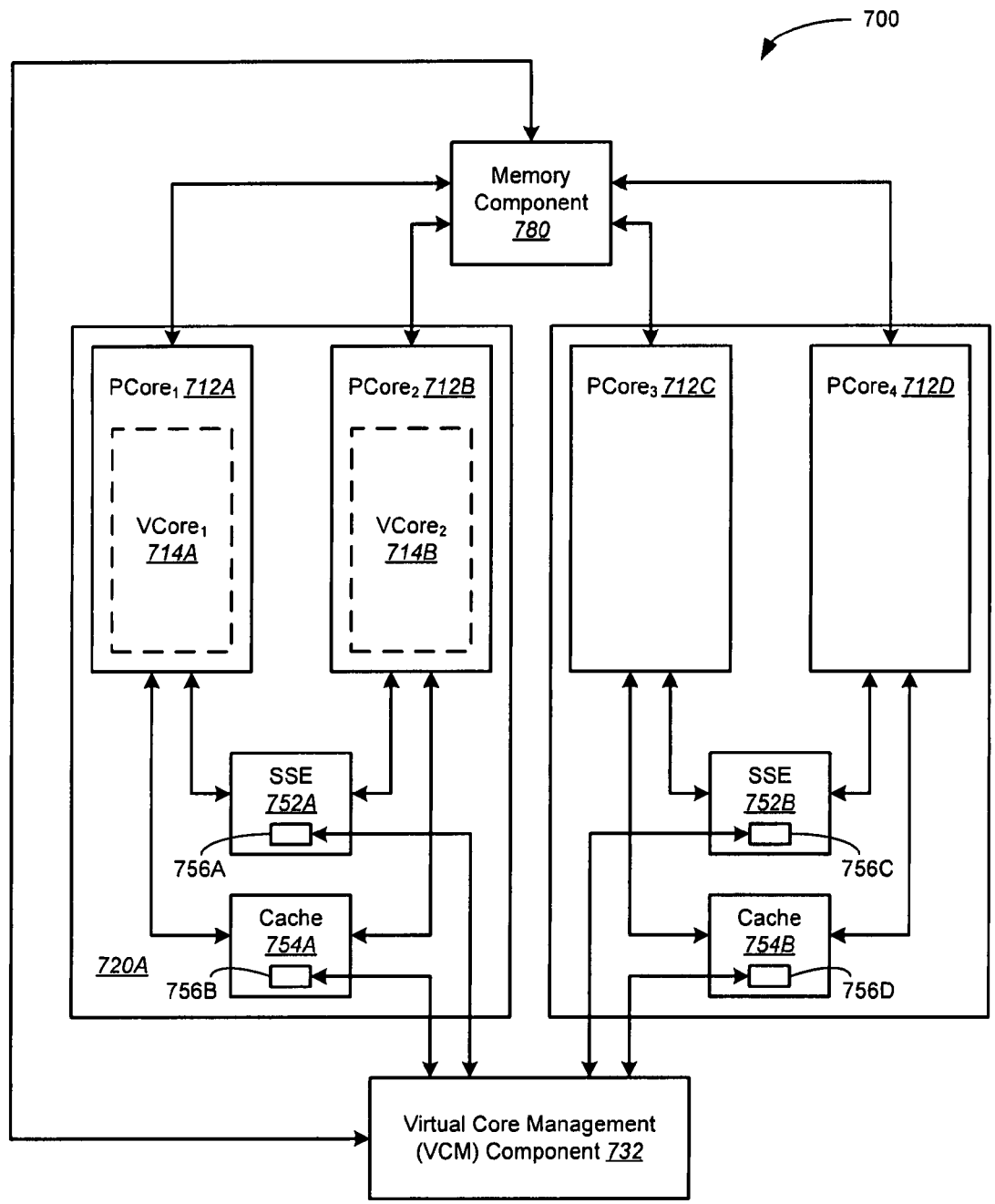
FIGS. 7A-7B show block diagrams illustrating shared resource contention in a VCM system in accordance with embodiments of the present disclosure.

FIG. 7A shows one embodiment of a block diagram illustrating shared resource contention in a VCM system 700 having one or more PCores 712A-712D provided in CPCs 720A and 720B, and one or more VCores 714A-714B mapped thereto. It should be appreciated that the one or more PCores 712A-712D may be configured to run (e.g., operate) any number of VCores, such as VCores 714A-714B, without departing from the scope of the present disclosure. It should be appreciated that any number of VCores, such as VCores 714A-714B, may be mapped to any of the one or more PCores 712A-712D without departing from the scope of the present disclosure.

In one embodiment, VCM system 700 comprises one or more performance counters 756A-756D for monitoring shared resource contention between PCores 712A-712D. As shown in FIG. 7A, VCM system 700 comprises one or more SSE (Streaming SIMD Extension) components, such as SSE units 752A, 752B and one or more a cache memory components, such as cache units 754A, 754B, wherein each of these components may be configured to comprise at least one performance counter 756A, 756B, 756C, 756D, respectively, for monitoring use of these components by PCores 712A-712D.

In one embodiment, SSE units 752A, 752B may comprise components or devices, such as co-processors, microcontrollers, or other logic devices, configured to support Streaming SIMD Extension instructions. In general, SIMD (Single Instruction, Multiple Data) comprises a computing technique for data level parallelism.

In one embodiment, cache units 754A, 754B comprise a memory storage device or component where frequently accessed data may be stored for rapid access. In general, cache memory comprises specialized RAM (random access memory), such as, for example, SRAM (static random access memory), which may be used to optimize data transfers between system components. In various embodiments, cache memory may be implemented as multi-level cache and/or as part of a multi-level cache (e.g., an L1 cache, L2 cache, L3 cache, etc.).

In one embodiment, two or more PCores 712A-712D may be adapted to share SSE units 752A, 752B and cache units 754A, 754B. As shown in FIG. 7A, first and second PCores 712A, 712B may be adapted to share first SSE unit 752A and first cache 754A, and third and fourth PCores 712C, 712D may be adapted to share second SSE unit 752B and second cache 754B. Hence, in one embodiment, one or more performance counters 756A-756D may be shared by at least two PCores 712A-712D to monitor (e.g., track) shared resource contention between PCores 712A-712D for shared use of SSE units 752A, 752B and cache units 754A, 754B, respectively. For example, as shown in FIG. 7A, PCores 712A and 712B share performance counters 756A and 756B of SSE unit 752A and cache unit 754A, respectively, and PCores 712C and 712D share performance counters 756C and 756D of SSE unit 752B and cache unit 754B.

In one embodiment, VCM system 700 comprises a VCM component 732 that is adapted to communicate with performance counters 756A-756D. As previous discussed, VCM component 732 may be adapted to communicate with PCores 712A-712D and map one or more VCores 714A-714B to PCores 712A-712D.

In one implementation, performance counters 756A-756D are adapted to provide an indication of an amount of contention between PCores 712A-712D. For example, a threshold value may be set on the performance counters, and when the value is reached, performance counters 756A-756D are adapted to inform VCM component 732 of this event to alleviate or at least reduce shared resource contention between PCores 712A-712D. In another implementation, VCM component 732 may be adapted to periodically poll performance counters 756A-756D to determine whether high contention is sensed between PCores 712A-712D to alleviate or at least reduce shared resource contention between PCores 712A-712D. As such, VCM component 732 is adapted to intelligently map VCores 714A-714B, to PCores 712A-712D, to reduce shared resource contention between PCores 712A-712, by interfacing with performance counters 756A-756D.

Figure 7B:
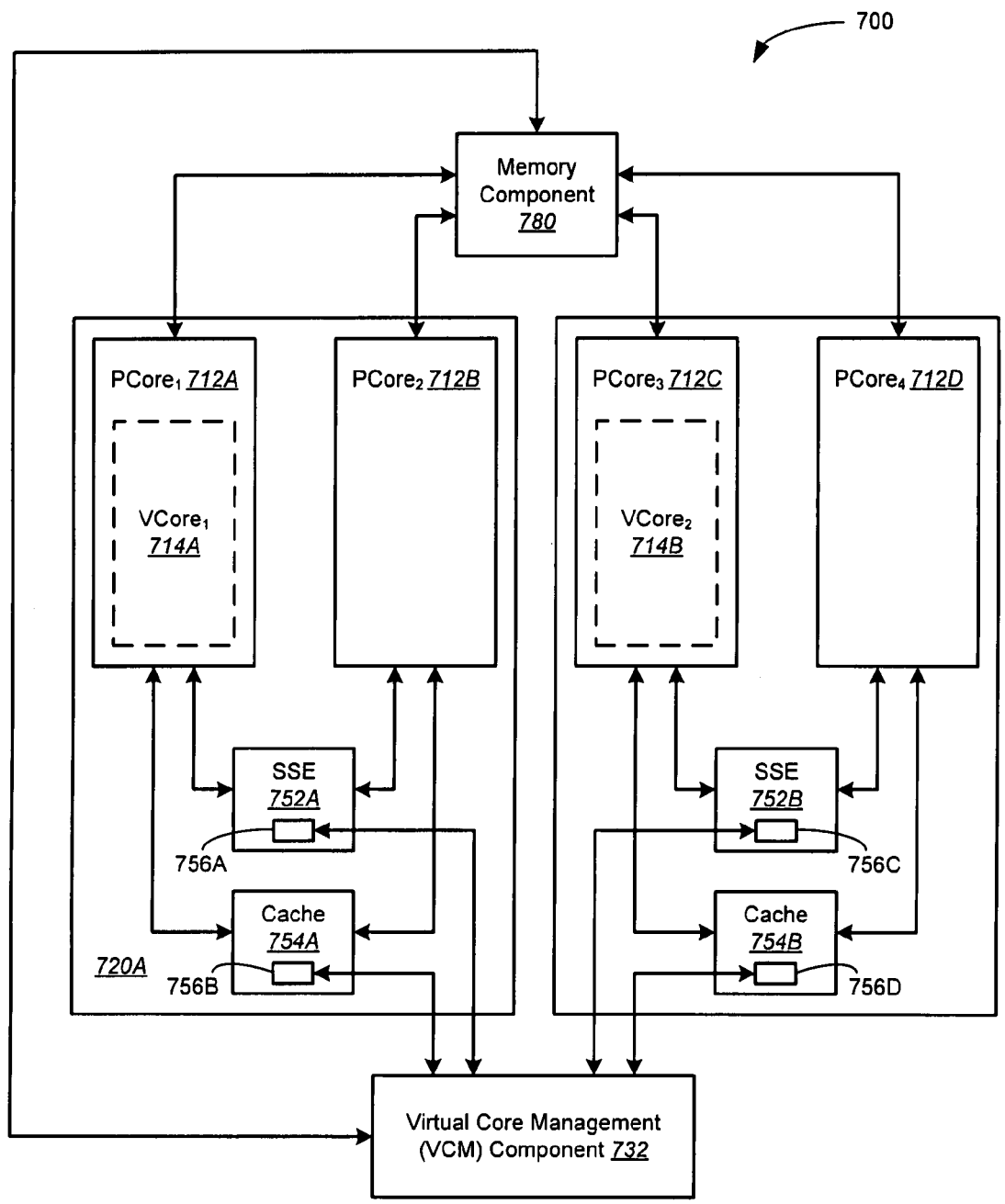

In one embodiment, referring to FIGS. 7A and 7B, a processor having four physical cores 712A-712D may be divided into two core pairs 720A and 720B, which may be referred to as a core pair complex (CPC). As shown in FIGS. 7A and 7B, each core pair 720A, 720B may be adapted to share an SSE unit 752A, 752B, respectively, and/or a cache unit 754A, 754B, respectively. If VCM component 732 exposes two of the four VCores 714A-714D to an OS, the OS may schedule two threads on first and second VCores 714A, 714B. If VCores 714A, 714B are mapped to first and second PCores 712A, 712B to run the two threads, and PCores 712A, 712B are heavily using first SSE unit 752A and/or cache unit 754A, while third and fourth PCores 712C, 712D are not heavily using second SSE unit 752B and/or cache unit 754B, then VCM component 732 may be adapted to schedule the two SSE-heavy threads on two different core pairs 720A, 720B, so that each thread uses a separate SSE unit 752A, 752B and/or cache unit 754A, 754B, as shown in FIG. 7B. In one example, in a manner as previously discussed, VCM component 732 may remap second VCore 714B from second PCore 712B to third PCore 712C by storing second VCore 714B in a memory component 780, unmapping second VCore 714B from second PCore 712B, mapping second VCore 714B to third PCore 712C, and then transferring second VCore 714B to third PCore 712C for operation thereon.

In various implementations, VCM component 732 may be adapted to monitor contention of shared resources of physical cores. If VCM component 732 detects some shared resources that may be thrashed by multiple physical cores, VCM component 732 may attempt to remap the threads among physical cores. In the above embodiments, VCM component 732 may remap the two SSE heavy threads onto two physical cores that are in different core pairs, as discussed in reference to FIGS. 7A and 7B.

Figure 8:
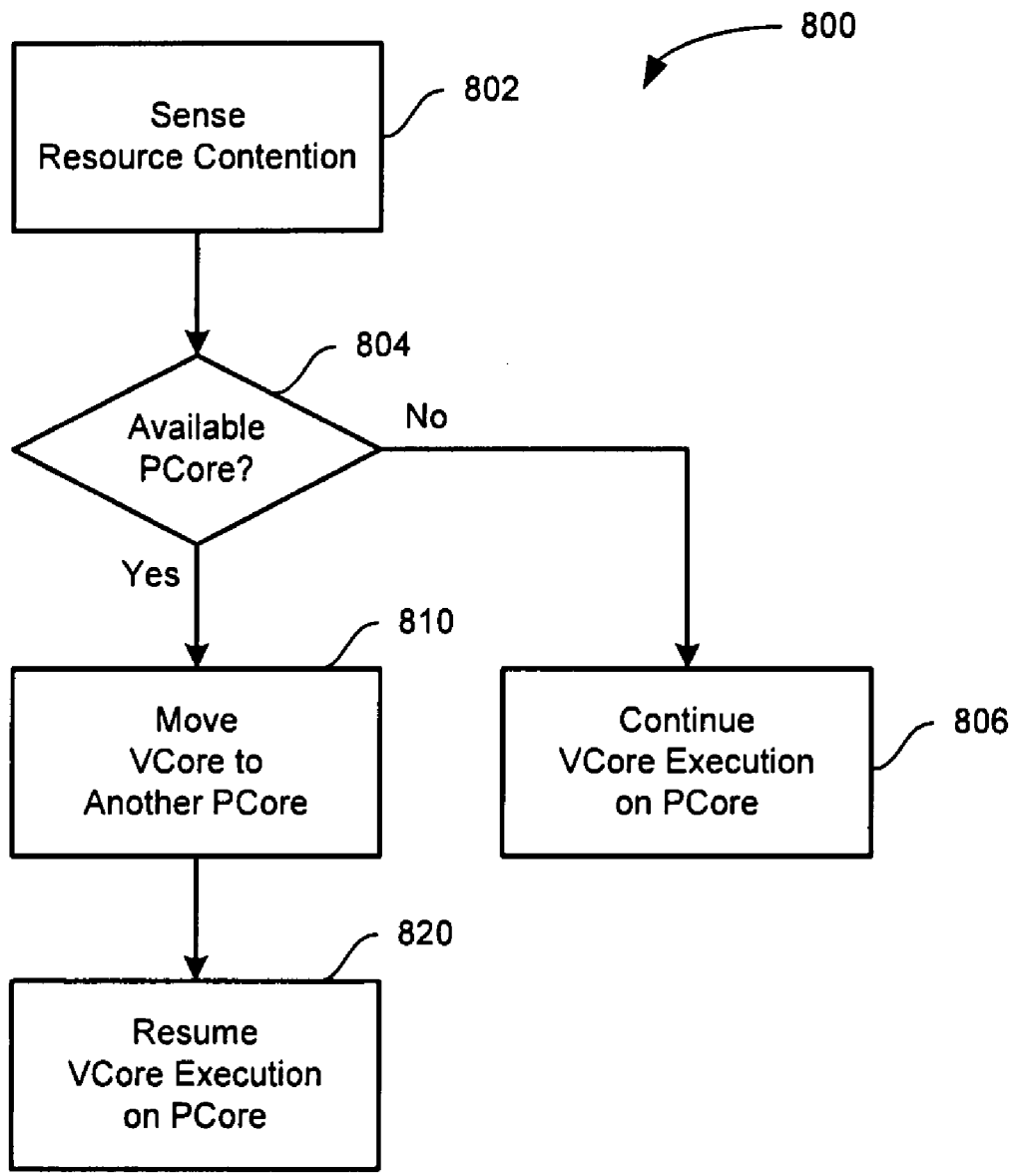
FIG. 8 shows a block diagram illustrating a method for reducing shared resource contention between physical cores in accordance with an embodiment of the present disclosure.

FIG. 8 shows one embodiment of a block diagram illustrating a method 800 for reducing shared resource contention between physical cores with reference to FIGS. 7A-7B. It should be appreciated that method 800 of FIG. 8 may be applied to any embodiments of FIGS. 1A thru 2H and related components thereof without departing from the scope of the present disclosure.

In one embodiment, referring to FIGS. 7A, 7B and 8, VCM component 732 is adapted to sense (e.g., detect) shared resource contention between one or more PCores 712A-712D, sharing one or more resources, such as SSE units 752A, 752B and cache units 754A, 754B, from at least one performance counter 756A-756D (block 802). VCM component 732 is adapted to determine whether at least one other PCore, such as PCores 712C, 712D, is available to remap one or more VCores 714A, 714B to this available (e.g., less used) PCore (block 804). In one embodiment, the term 'available' may refer to a condition of eligibility, wherein a PCore with less contention may be selected. If not, VCM component 732 is configured to resume VCore execution without reducing resource contention between PCores (block 806). Otherwise, if so, VCM component 732 is adapted to remap at least one VCore 714B to the available PCore 712C by performing, for example, method 400 of FIG. 4A (block 810) to reduce shared resource contention between PCores 712A, 712B. After remapping of second VCore 714B to third PCore 712C, as shown in FIG. 7B, VCM component 732 resumes execution of VCore 714B on PCore 712C (block 820).

FIGS. 7A and 7B show one implementation of method 800 as discussed in reference to FIG. 8. As shown in FIGS. 7A and 7B, VCM system 700 comprises four PCores 712A-712D and two VCores 714A-714B mapped to first and second PCores 712A, 712B, respectively. In reference to method 800 of FIG. 8, VCM component 732 is adapted to sense shared resource contention between first and second PCores 712A and 712B sharing resources of SSE unit 752A and cache unit 754A from performance counters 756A and 756B (block 802). VCM component 732 determines that third and fourth PCores 712C and 712D are available to remap at least one of VCores 714A and 714B to at least one of the available third and fourth PCores 712C and 712D (block 804). In one example, VCM component 732 is adapted remap second VCore 714B from second PCore 712B to third PCore 712C by implementing, for example, method 400 of FIG. 4A (block 810). Once remapped, VCM component 732 resumes execution of second VCore 714B on third PCore 712C (block 620).

In various implementations, virtual core management may include resource management considerations. In one implementation, the VCM component may adjust the mapping of virtual cores to physical cores to more efficiently share (e.g., optimize) the utilization of or improve the load balancing of physical resources. In one example, given a set of virtual cores, each with a corresponding execution status (e.g., executing one or more programs with certain characteristics, or sleeping, etc.), and a set of physical cores, each with corresponding resource constraints (e.g., shared units, execution efficiency characteristics, frequency limits, power-consumption limits, etc.), the VCM component may be adapted to optimize the assignments of virtual cores to physical cores in order to achieve some desired goal, such as improving performance, energy efficiency, etc.

In another implementation, The VCM component may change a mapping in response to detecting a resource constraint. In one example, the resource constraint may include a shared resource and/or a resource present in some of the physical cores, such as an execution unit for executing a given instruction. In another example, the resource constraint may include cache data wherein, if a virtual core mapped to a first physical core associated with a first cache begins executing code that generates a high rate of cache misses that are satisfied by a data stored in a second cache associated with a second physical core, the VCM component may remap the virtual core to the second physical core. In another example, the resource constraint may include memory latency, wherein, in a system with non-uniform cache or DRAM distribution (e.g., where a physical core sees different latencies for accesses to different caches, DRAMs, etc.), the VCM component may be adapted to remap a virtual core to a different physical core so that latency may be lowered. This may happen in response to receiving or reading data from performance counters and may involve some evaluation that the cost of performing the remapping function is justified by the expected performance gain or energy savings. In another example, the resource constraint may be based on static constraints, such as a situation in which a resource component is continuously shared with one or more other physical cores. In another example, the resource constraint may be based on run-time or dynamic constraints, such as a situation that a shared resource is temporarily shared with one or more other physical cores based on the execution of code.

In another implementation, the VCM component may change a mapping in response to detecting inefficient operation, which may be a resource that has a more capable implementation in only some of the physical cores, such as a high-performance execution unit in some cores vs. low-performance execution units in other physical cores. In one example, the VCM component may detect that a thread executing on a virtual core is making heavy use of floating point when the virtual core is mapped to a physical core that has a low-performance floating-point unit, and remap the virtual core to a physical core with a higher-performance floating-point unit.

It should be appreciated that the above discussion of FIG. 8 represents one embodiment of a method to reduce shared resource contention between physical cores, and thus various other embodiments may be considered applicable in reference to embodiments presented in any figures discussed herein.

Figure 9:
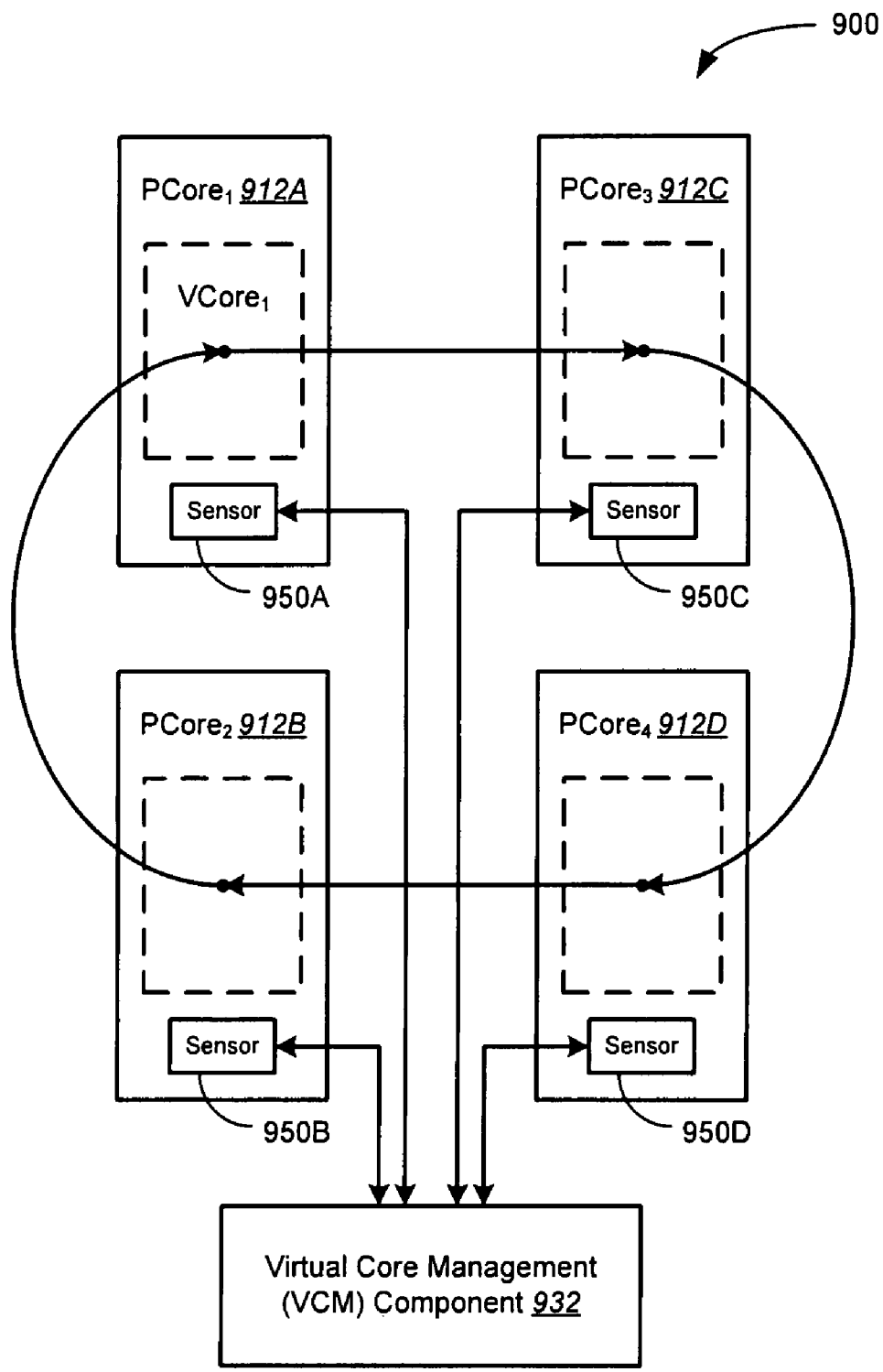
FIG. 9 shows a block diagram illustrating a VCM system having a plurality of PCores and one or more temperature sensors in accordance with an embodiment of the present disclosure.

FIG. 9 shows an embodiment of a block diagram illustrating a VCM system 900 having a plurality of PCores 912A-912D and a VCM component 932. As shown in FIG. 9, each PCore 912A-912D comprises at least one temperature sensor 950A-950D, respectively, for sensing temperature during operation of PCores 912A-912D. In general, a physical core may produce heat during operation, and an increase in temperature due to an excessive amount of produced heat may adversely affect performance of the physical core, which may undermine the efficiency of the physical core to perform operations and execute programs, instructions, tasks, threads, etc.

As shown in FIG. 9, VCM component 932 maps a VCore 914A to a first PCore 912A. Upon sensing a temperature above a threshold, VCM component 932 may decide to migrate VCore 914A to another PCore 912C to avoid overheating first PCore 912A and improve the execution of VCore 914A. In one embodiment, the threshold may be set at a particular level of temperature depending on a desired performance level of a physical core. VCM component 932 may perform core migration among a plurality of PCores 912A-912D, by rotating VCore 914A from one physical core to another physical core, as shown in FIG. 9.

In various implementations, virtual core management may include temperature considerations. The VCM component may remap a virtual core from one physical core to another in response to exceeding a temperature threshold in the one physical core. In one example, the VCM component may perform an analysis of a possible remap and perform the remap when the results of the analysis are favorable. The VCM component may remap a virtual core from one physical core to another in response to a high temperature indication from the one physical core. In one example, the VCM component may perform the remap to reduce leakage power associated with operating a virtual core on the one physical core, since leakage power increases with higher temperatures. The VCM component may remap a virtual core from one physical core to another in response to temperature measurements of multiple physical cores. The VCM component may not map a virtual core to a physical core near a second physical core when an important virtual core is mapped to the second physical core. The VCM component may remap a virtual core from one physical core to another physical core on some regular schedule to provide a more even distribution of hot spots or to provide a more even distribution of circuit operation as a cause of routine reliability degradation. The VCM component may modify temperature measurements of physical cores before providing temperature data to external hardware or software through a virtual core interface. The VCM component may avoid a situation where temperature of a virtual core jumps around rapidly, which may be misinterpreted as an error condition by external hardware or software. The VCM component may adjust P-state tables associated with a virtual core according to the temperature or power limits of a corresponding physical core. In one example, the VCM component may change a performance state of a physical core defined in the P-state tables to correspond to a level of performance that is possible given the temperature or power limits of the corresponding physical core.

Figure 10:
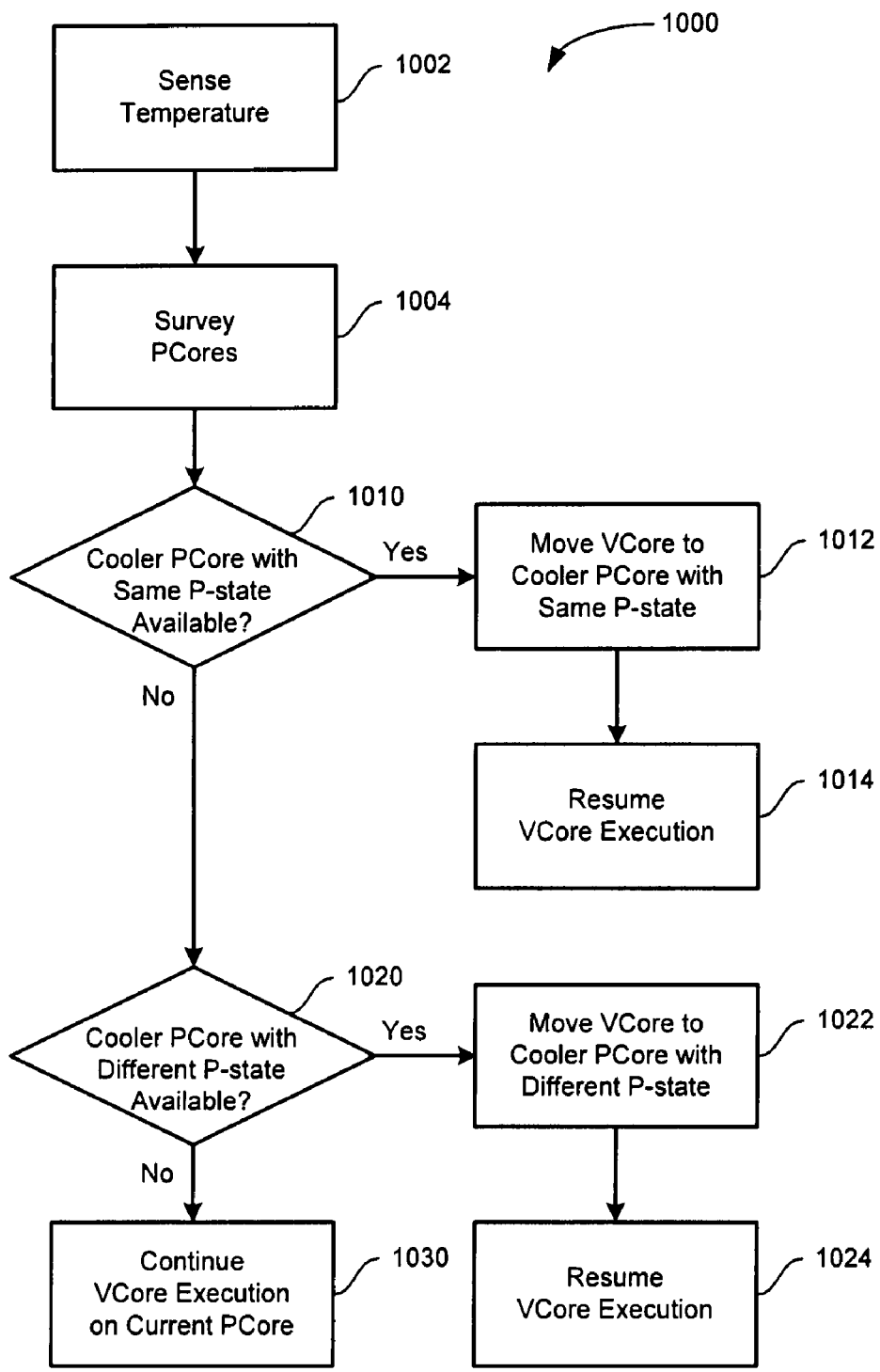
FIG. 10 shows a block diagram illustrating a method for migrating a virtual core form one PCore to another PCore based on sensing temperature in accordance with an embodiment of the present disclosure.

FIG. 10 shows one embodiment of a block diagram illustrating a method 1000 for migrating virtual cores to other physical cores based on sensing temperature of the physical core with reference to FIG. 9. It should be appreciated that method 1000 of FIG. 10 may be applied to any embodiments of FIGS. 1A thru 2H and related components thereof without departing from the scope of the present disclosure.

In one embodiment, referring to FIGS. 9 and 10, VCM component 932 is adapted to migrate VCore 914A among a plurality of PCores 912A-912D upon sensing an adverse temperature (block 1002). VCM component 932 is adapted to survey PCores 912A-912D for availability, performance characteristics and current temperature (block 1004). VCM component 932 is adapted to determine whether at least one PCore 912B-912D is available having a lower temperature and similar performance characteristics for virtual core migration (block 1010). If yes, then VCM component 932 is adapted to remap at least one VCore 914A to one of the available PCores 912B-912D by performing, for example, method 400 of FIG. 4A (block 1012) to reduce heat production of at least PCore 912A. After remap of VCore 914A to at least one of PCores 912B-912D, as shown in FIG. 9, VCM component 932 resumes execution of VCore 914A on the at least one PCore 912B-912D (block 1014).

Otherwise, if no, then VCM component 932 is adapted to determine if at least one PCores 912B-912D is available having a lower temperature and different performance characteristics for virtual core migration (block 1020). If yes, then VCM component 932 is adapted to remap at least one VCore 914A to the at least one available PCore 912B-912D by performing, for example, method 400 of FIG. 4A (block 1022) to reduce heat production of at least PCore 912A. After remap of VCore 914A to at least one of PCores 912B-912D, as shown in FIG. 9, VCM component 932 resumes execution of VCore 914A on the at least one PCore 912B-912D (block 1024). Otherwise, if no, then VCM component 932 continues VCore execution on the currently mapped PCore (block 1030). In one embodiment, in reference to block 1030, VCM component 932 may optionally reduce the performance level of the PCore to lower the temperature of the PCore.

As discussed above, FIGS. 9 and 10 show an embodiment of a system and method for dispersing heat in a VCM environment in accordance with an embodiment of the present disclosure. In one implementation, the system and method may prevent a physical core from overheating by spreading heat across a processor. As shown in FIG. 9, each physical core may comprise a thermal sensor, such as the one or more sensors 950A-950D. In one example, if the temperature of a first physical core reaches a particular threshold, VCM component 932 may migrate a virtual core mapped to the first physical core to a different physical core to thereby lower the temperature of the first physical core, which may be overheating. In another example, VCM component 932 may periodically migrate virtual cores onto different physical cores based on thermal sensor readings so as to distribute heat across a plurality of physical cores and the processor package. Since transistors may consume higher levels of power at higher temperatures, the system and method as discussed herein may spread heat across the physical cores and the processor package in a manner so as to achieve lower overall power consumption.

Figure 11:
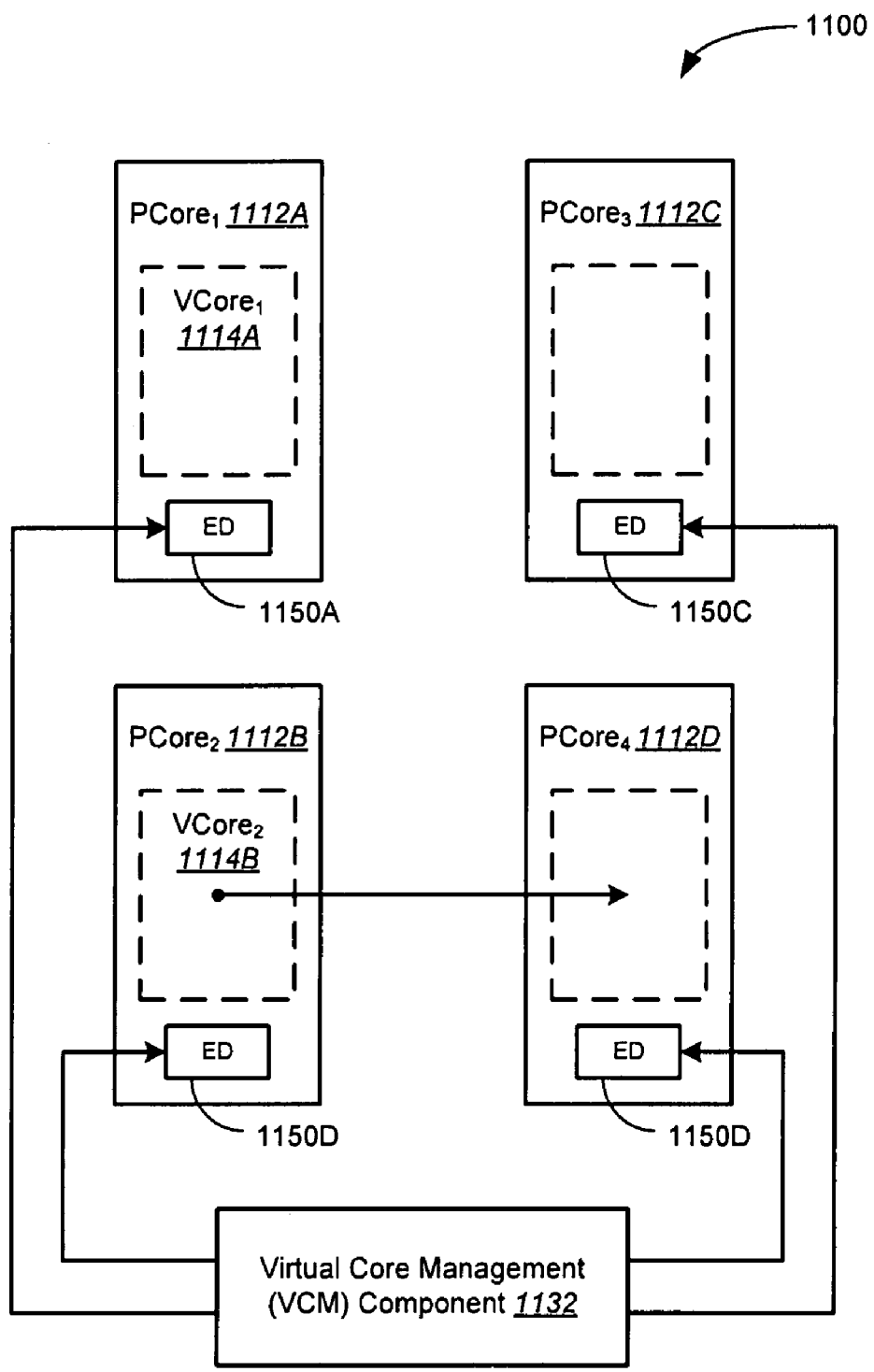
FIG. 11 shows a block diagram illustrating a VCM system having a plurality of PCores and one or more error detectors in accordance with an embodiment of the present disclosure.

FIG. 11 shows an embodiment of a block diagram illustrating a VCM system 1100 having a plurality of PCores 1112A-1112D and a VCM component 1132. As shown in FIG. 11, each PCore 1112A-1112D may comprise at least one error detector (ED) 1150A-1150D, respectively, for detecting errors (e.g., error conditions) during operation of PCores 1112A-1112D. In general, a physical core may produce an error condition during operation, and error conditions may cause the physical core to quiesce into a temporary inactive or inhibited state, which may adversely affect the performance of the physical core and undermine the efficiency of the physical core to perform operations and execute instructions, tasks, threads, etc.

As shown in FIG. 11, first and second VCores 1112A, 1112B are mapped to first and second PCores 1114A, 1114B, respectively. In one implementation, upon detecting an error condition (e.g., receiving an error condition signal) on second PCore 1112B, VCM component 1132 may decide to remap second VCore 1114B to another PCore 1112D to avoid inactivity of second VCore 1114A on second PCore 1112B. Thus, in one instance, VCM component 1132 may perform core migration of second VCore 1114B from second PCore 1112B to fourth PCore 1112D, as shown in FIG. 11.

Figure 12:
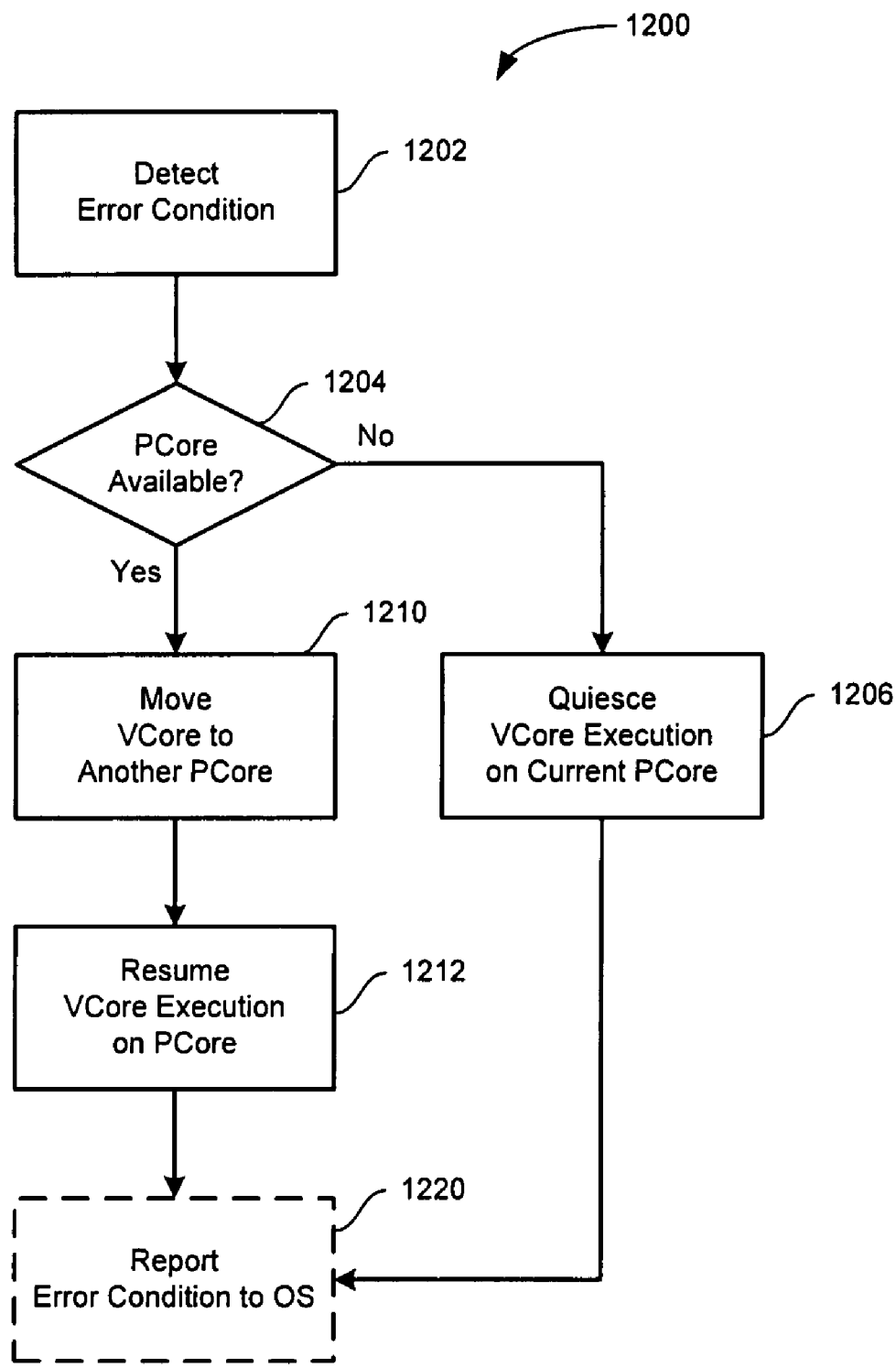
FIG. 12 shows a block diagram illustrating a method for moving a VCore from one PCore to another PCore based on detecting an error condition in accordance with an embodiment of the present disclosure.

FIG. 12 shows an embodiment of a block diagram illustrating a method 1200 for remap virtual cores to other physical cores based on detecting errors of one or more physical cores with reference to FIG. 11. It should be appreciated that method 1200 of FIG. 12 may be applied to any embodiments of FIGS. 1A thru 2H and related components thereof without departing from the scope of the present disclosure.

In one embodiment, referring to FIGS. 11 and 12, VCM component 1132 is adapted to remap second VCore 1114B from one second PCore 1112B to another PCore 1112D upon detecting an error condition (block 1202). VCM component 1132 is adapted to determine if at least one PCore 1112D is available for virtual core migration (block 1204). In one embodiment, VCM component 1132 may select an available physical core having similar performance characteristics. If no, then VCM component 1132 may be adapted to quiesce VCore execution on the currently mapped PCore (block 1206) and optionally inform the OS of the detected error condition and quiescence of the PCore (block 1220). Otherwise, if yes, then VCM component 1132 is adapted to remap second VCore 1114B to the available PCore 1112D by performing, for example, method 400 of FIG. 4A (block 1210) to provide transparent failover of second PCore 1112B. After remap of second VCore 1114B to fourth PCore 1112D, as shown in FIG. 11, VCM component 1132 resumes execution of second VCore 1114B on fourth PCore 1112D (block 1212) and optionally inform the OS of the detected error condition of second PCore 1112B (block 1220).

In various implementations, virtual core management may include error-handling considerations. In one example, the VCM component may remap a virtual core from one physical core to another physical core in response to detecting an error condition on one of the physical cores. These errors may include memory errors, such as parity and ECC (error correction code), and logic errors, such as bus errors (parity or ECC), cross-checking errors in a master/checker configuration and assertion checking errors. In another example, the VCM component may remove a physical core from a set of physical cores that are managed by the VCM component in response to detecting a permanent error condition on the physical core. For example, detected errors may include parity or ECC errors above a threshold or a single instance of a logic error.

As discussed above, FIGS. 11 and 12 show an embodiment of a system and method for responding to a failover (e.g., error condition) in a VCM environment in accordance with an embodiment of the present disclosure. In one implementation, the system and method may provide instant and/or transparent failover with core redundancy in a VCM environment. In one example, as previously discussed, VCM component 1132 may be adapted to expose a fewer number of virtual cores to the OS than there are physical cores. The unexposed physical cores may function as backups in response to failovers, for example. If an error condition is detected by VCM component 1132 within a physical core having a currently mapped virtual core, then VCM component 1132 may be adapted to remap the virtual core onto one of the backup physical cores.

In various implementations, this feature may be transparent (e.g., undetectable, invisible, etc.) to the OS or applications thereof so as to achieve, for example, an instant and transparent failover. In one embodiment, VCM component 1132 may be adapted to maintain a list (e.g., table) of available PCores, wherein a PCore having an error condition may be removed from the list of available PCores until at least the error condition is resolved. In various other embodiments, VCM component 1132 may inform the OS of error conditions, hardware failure and/or performance state changes of physical cores.

The following table comprises a transaction redirection component (TRC) for use in a multi-core processor, such as an x86 multi-core processor, in accordance with various embodiments of the present disclosure. In one embodiment, the VCM component (e.g., VCM controller) is adapted to configure the transaction redirection component (TRC) as an interrupt redirection table (IRT) as follows.

In one implementation, one or more interrupt signals that may be redirected to physical cores include:

TABLE 1

Interrupt Signals

| Signals | Originator |
| --- | --- |
| INIT | APIC |
| SMI | APIC |
| NMI | APIC |
| INTR | APIC |
| ExtINT | APIC |
| MON_WAKEUP | Monitor |

In one implementation, the IRT may be configured through the following registers by an on-chip micro-controller (MCU), such as a VCM component:

TABLE 2

IRT_VCi_CTL Register Layout

| bit | name | function | r/w | reset |
| --- | --- | --- | --- | --- |
| 7:0 | pcore_idx | pcore index | rw | X |
| 8 | active | vcore-to-pcore mapping | rw | X |

TABLE 3

IRT_INT_MASK Register Layout

| Bit | name | function | r/w | reset |
| --- | --- | --- | --- | --- |
| 0 | irt_int_mask_0 | vcore0 IRT_INT mask | rw | X |
| 1 | irt_int_mask_1 | vcore1 IRT_INT mask | rw | X |

TABLE 4

IRT_INT_PENDING Register Layout

| bit | name | function | r/w | reset |
| --- | --- | --- | --- | --- |
| 0 | int_pending_0 | vcore0 int pending | r | X |
| 1 | int_pending_1 | vcore1 int pending | r | X |

When IRT_VCi_CTL.active is set, one or more signals listed in Table 1 for vcore(i) may be redirected to core (IRT_VCi_CTL.pcore_idx).

When IRT_VCi_CTL.active is clear, if at least one of the signals listed in Table 1 for vcore(i) become asserted, IRT_INT_PENDING.int_pending_i bit may become set. If IRT_INT_MASK.irt_int_mask_i bit is clear, an IRT_INT interrupt signal may be asserted to MCU. The IRT_INT handler in MCU firmware may be adapted to read IRT_INT_MASK and IRT_INT_PENDING registers to discover which VCores may be mapped onto pcores to service pending interrupts. The int_pending_i bit may be cleared if one or more of the signals listed in Table 1 for vcore(i) become de-asserted.

IRT_INT_MASK may be needed for time-sharing one pcore with multiple VCores, in which case, IRT_INT may be masked for an inactive VCore even if interrupts may be pending. Firmware may be adapted to ensure that one or more active VCores have irt_int_mask_i set to inhibit spurious IRT_INT to the MCU.

int_pending_i=(INTR_i
    |ExtINT_i
    |SMI_i
    |NMI_i
    |INIT_i
    |MON_WAKEUP_i | ... )
    IRT_INT=(int_pending_0 & ~irt_int_mask_0)
    |(int_pending_1 & ~irt_int_mask_1)
    |(int_pending_2 & ~irt_int_mask_2)
    | ...

In one implementation, MCU Firmware may be adapted to ensure that there may not be two entries in IRT with the same pcore_idx and active bit set at the same time even for a short period of time.

In one implementation, the following discloses an example of how MCU firmware may use the above registers to remap vcore(i) from pcore(a) to pcore(b):

set irt_int_mask_i
    clear IRT_VCi_CTL.active
    notify microcode running on pcore(a) to store one or more logical states to memory
    stop pcore(a), and optionally put pcore(a) into a low power state
    start pcore(b)
    notify microcode running on pcore(b) to restore the one or more logical states from memory
    change IRT_VCi_CTL.pcore_idx from a to b, and set active bit In various implementations, virtual core management may include interrupt mapping considerations. In one example, the VCM component may map a virtual core to a physical core in response to receiving an interrupt signal intended for a virtual core that is not currently mapped to a physical core. In another example, the VCM component may remove virtual cores from a set of two or more virtual cores sharing a single interrupt in response to the virtual core being unmapped from a physical core, wherein at least one virtual core may remain in the set. This may be referred to as 'arbitrated interrupts' in the APIC specification and may be implemented with a bit-map mask where one bit is associated with each virtual core.

Figure 13:
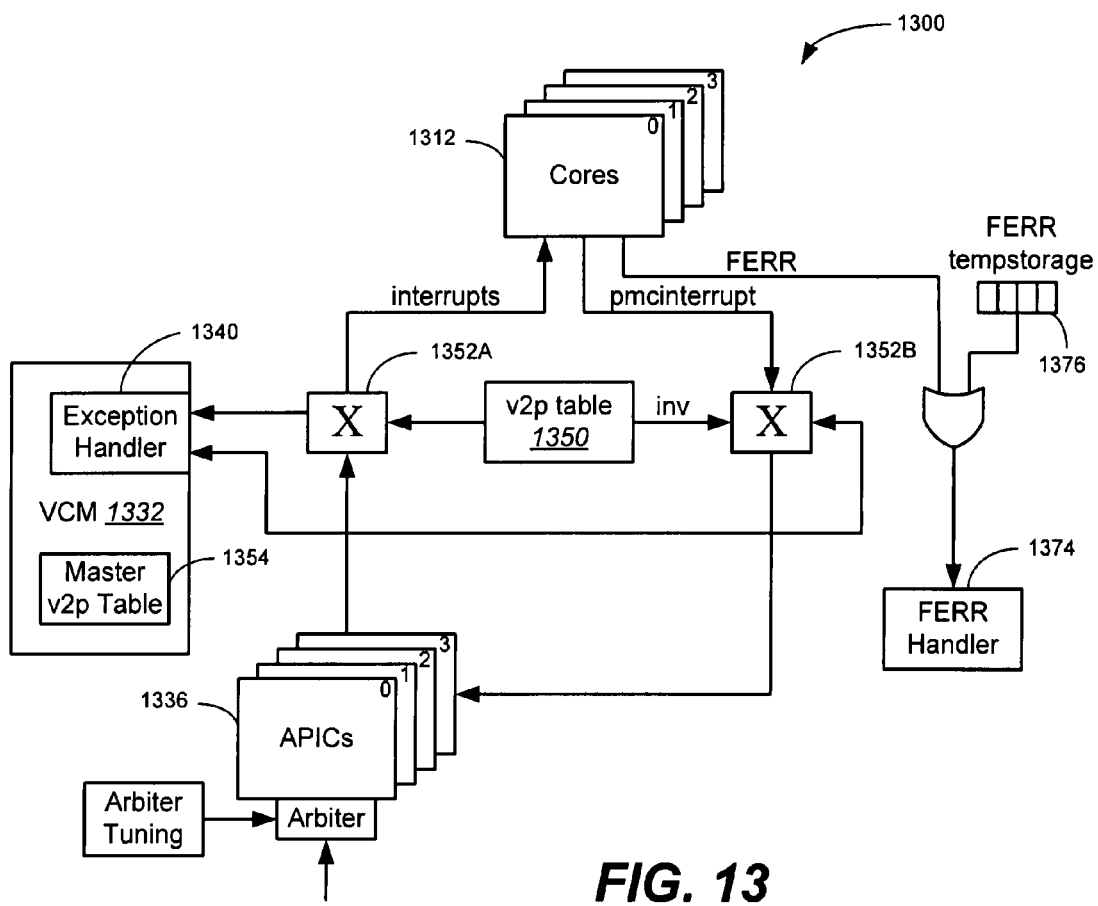
FIGS. 13-14 show block diagrams illustrating various other embodiments of VCM systems in accordance with implementations of the present disclosure.

FIG. 13 shows one embodiment of a VCM system 1300 using a virtual-to-physical (V2P) table 1350, such as the transaction redirection component (TRC) discussed herein, to configure one or more switches/multiplexers 1352A-1352B to provide a switching function that connects one or more PCores 1312 to one or more vAPICs 1336.

In one embodiment, VCM component 1332 comprises an exception handler component 1340 that is adapted to communicate with switches/multiplexers 1352A-1352B. In addition, VCM component 1332 may be adapted to comprise and maintain a master V2P table 1354 in the memory component.

In one example, exception handler component 1340 is adapted to accept a signal that is routed from a vAPIC 1336 to a PCore 1312 when the PCore 1312 is not currently associated with the vAPIC 1336. This may occur when a VCore is currently not mapped to the PCore 1312. In this instance, the exception is handled by VCM component 1332 by mapping a VCore to a PCore 1312 when a PCore 1312 becomes available. In another example, exception handler component 1340 is adapted to accept a signal that is routed from a PCore 1312 to a vAPIC 1336, when the vAPIC 1336 is not currently associated with the PCore 1312. This may occur when an event happens in a PCore 1312 that is not currently in use, such as when a logic error or over-temperature condition is detected. In this instance, the exception is handled by VCM component 1332 by removing the faulty or high temperature PCore 1312 from the list of PCores 1312 that are eligible to have a VCore mapped to them.

In one embodiment, the APIC logic has a VCore-to-PCore mapping table in one or more of the registers. The APIC Transaction redirection component 1352A knows to which PCore an interrupt needs to be sent. The TRC also allows interrupts to be sent to the VCM component 1332, when a VCore is unmapped or unavailable. The inverted version 1352B of the APIC TRC may be used to route PCore interrupt signals from the performance monitoring counters to the proper VCore APIC. The APIC arbitration logic has arbitration hint registers that skew the distribution of arbitrated interrupts to certain VCores based on the availability of the underlying PCore to optimize power. While this may not directly be a translation table, it may affect the VCore state based indirectly on PCore information. Firmware in the VCM component 1332 is adapted to hold a master copy 1354 of the APIC TRC, which it uses in its communications with the physical cores and to update copies thereof.

Figure 14:
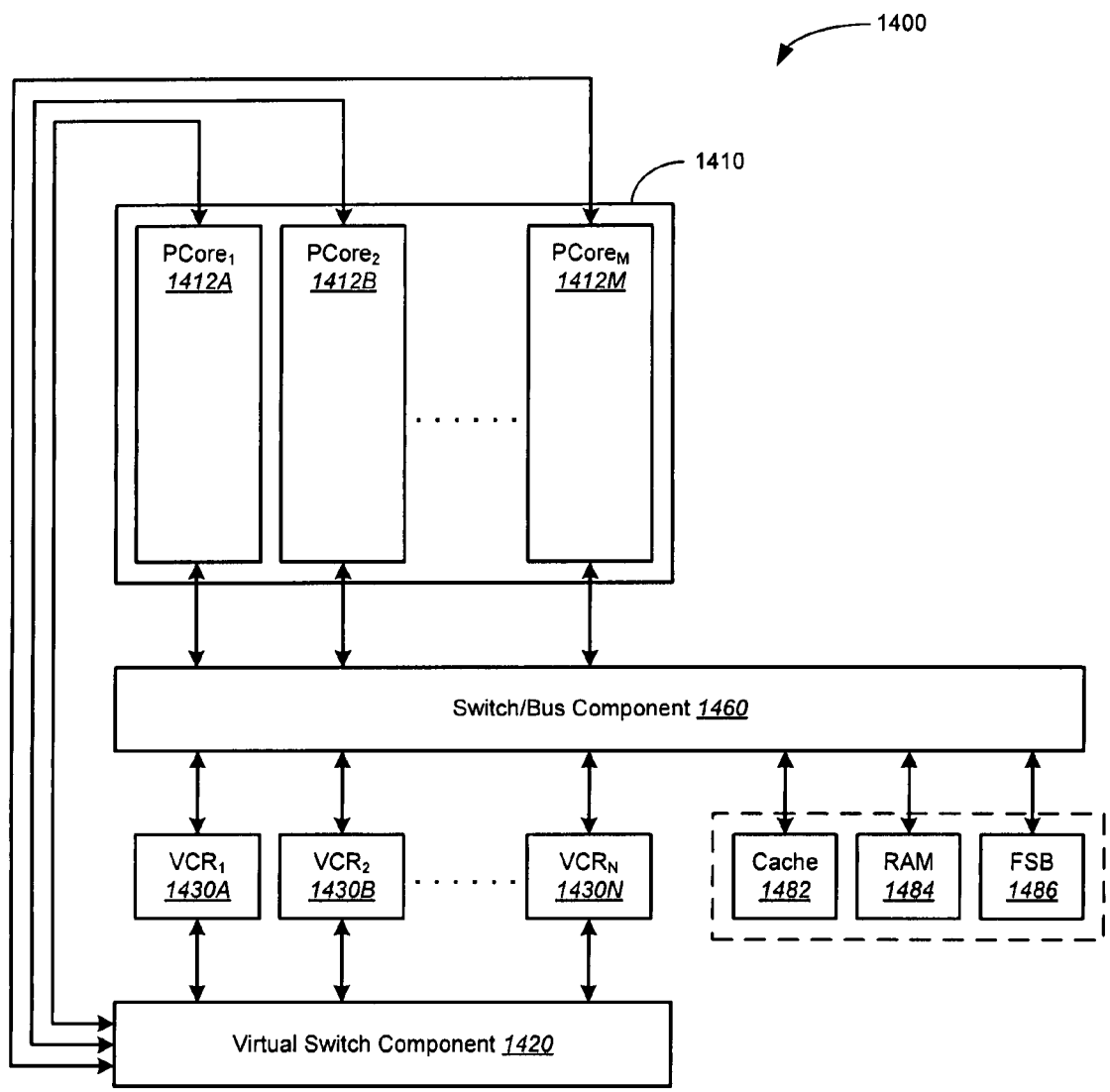

FIG. 14 shows one embodiment of a VCM system 1400 having a multi-core processor 1410 with one or more PCores 1412A-1412M, one or more virtual core resources (VCR) 1430A-1430N, one or more shared resources 1480, such as such as one or more caches 1482, RAM 1484, front-side bus (FSB) interface 1486, etc., a switch/bus component 1460 and a virtual switch component 1420.

In one embodiment, each PCore 1412A-1412M may have a corresponding virtual core resource 1430A-1430N, which may comprise, for example, an interrupt controllers (e.g., an APIC in an x86 multi-core processor). The virtual core resources 1430A-1430N may be adapted to have direct communication links to their corresponding PCore 1412A-1412M for receiving signals, such as interrupt signal, error indication signals, etc. However, in various other embodiments, virtual core resources 1430A-1430N may exist in a quantity that is different than the number of physical cores. For example, there may be more of one than the other, which means that direct communication links between each physical core and a corresponding VCR may not be feasible, so there should be a more flexible scheme for receiving transaction signals, such as interrupt signals, error indication signals, etc. As shown in FIG. 14, a more flexible scheme is represented by virtual switch component 1420, wherein the previously discussed transaction redirection component (TRC) may be implemented.

In one embodiment, VCM system 1400 may be adapted to include a central communication means through which these components communicate with each other (by memory operations, for example). In one embodiment, VCM system 1400 is adapted to comprise a VCM component and a memory component, as discussed in reference to previous figures. It should be appreciated that the VCM component may be positioned in VCM system 1400 so as to communicate with one or more of the components of VCM system 1400. In particular, the VCM component would be adapted to communicate with virtual switch component 1420 to manage and coordinate the switching function. Similarly, the memory component may be positioned in a manner to communicate with at least each of the PCores 1412A-1412M and the VCM component. In one implementation, the memory component may comprise a shared resource 1480, but it may be preferable in other implementations for the memory component to have direct connections to each of PCores 1412A-1412M.

In one embodiment, Floating Point Error (FERR) comprises a signal that originates from each PCore 1312. As shown in FIG. 13, FERR signals are ORed together with an OR gate 1372, and the result is used to send FERR signals to FERR handler 1374. The FERR signal may trigger a floating point interrupt and change the value of the IGNNE (ignore numerical error) virtual wire. In one implementation, this process may be mirrored locally for performance reasons. The FERR signal needs to be delivered to the southbridge. However, IGNNE messages from the southbridge may be ignored. Thus, a copy of IGNNE per physical core may be stored in FERR temp-storage 1376, and ignoring the global IGNNE virtual wire is possible. Since the FERR signal will disappear whenever a VCore is unmapped or isolated, the MCU uses backup CAB registers to store the FERR state of unmapped/unavailable physical cores. These are ORed together and with the real FERR signals from the CPCs to compute the final fullchip FERR. Each bit corresponds to the FERR state of a particular VCore.

Figure 15:
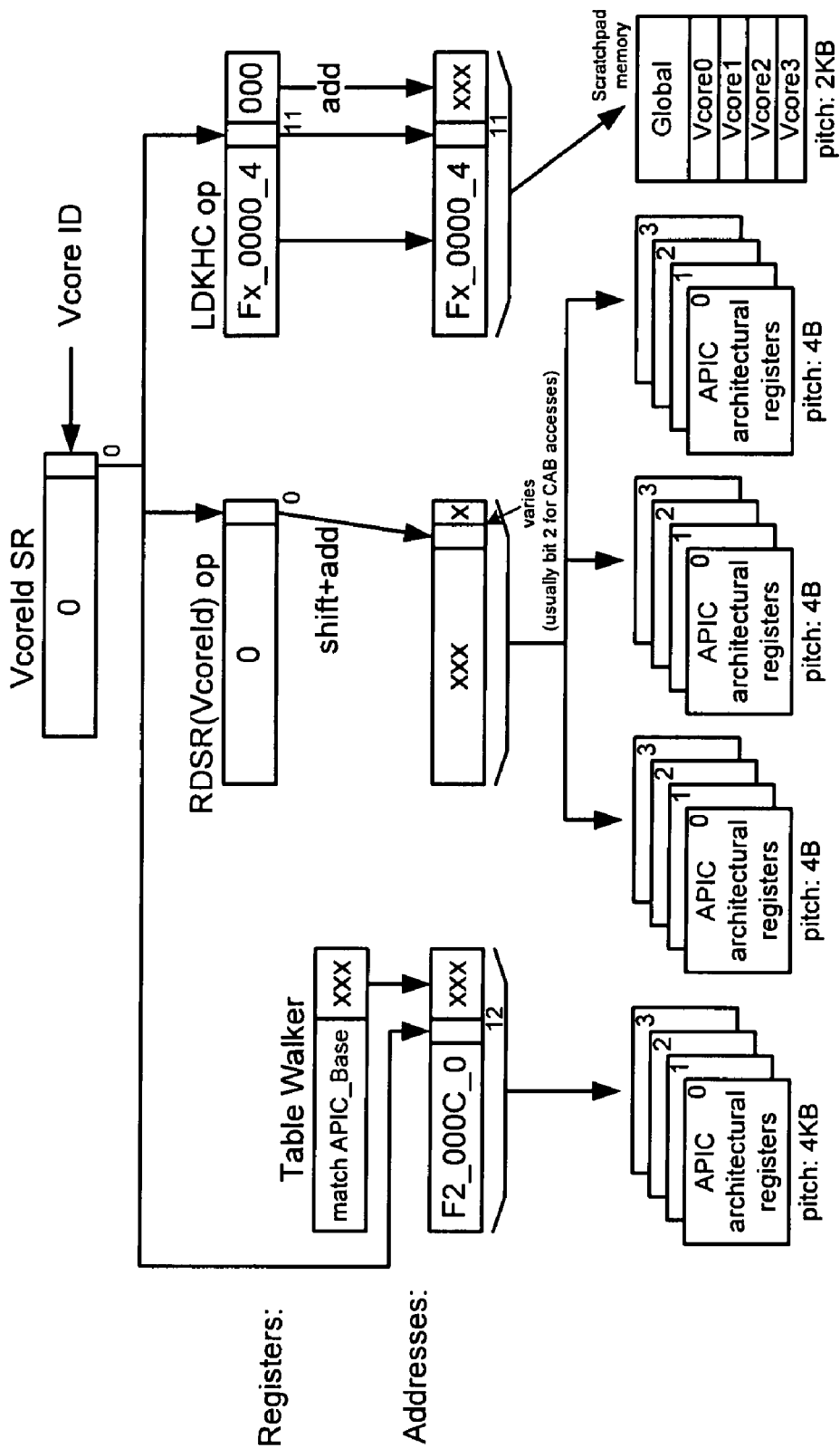
FIG. 15 shows one embodiment of register abstracting performed by a VCM component in accordance with implementations of the present disclosure.

FIG. 15 shows one embodiment of register abstracting that may be performed by the various VCM components previously described herein. In one embodiment, as shown in FIG. 15, each PCore has a Special Register (SR) called VCoreId, which may be programmed by emcode during a VCore mapping process and/or sequence. In one example, Emcode can use the SR directly using a RDSR operation to calculate an address of a VCore resource that does not follow the scratchpad pitch, which would include all CAB registers. In another example, Emcode can use the SR indirectly by using the LDKHC operation, which fills the VCore number in the appropriate location to access the VCore scratchpad pitch. The LDKHC logic uses the value in the VCoreId SR. The Table Walker remaps APIC accesses to the correct VCore address by inserting the VCore number in the right position in the physical address. The VCore number comes from the IU with each transaction, which is sourced by the VCoreId SR.

As known by one of ordinary skill in the art, this invention, including any logic circuit or transistor circuit, may be modeled, generated, or both by computer based on a description of the hardware expressed in the syntax and the semantics of a hardware description language (HDL). Such HDL descriptions are often stored on a computer readable medium. Applicable HDLs include those at the layout, circuit netlist, register transfer, and/or schematic capture levels. Examples of HDLs include, but are not limited to: GDS II and OASIS (layout level); various SPICE languages, and IBIS (circuit netlist level); Verilog and VHDL (register transfer level); and Virtuoso custom design language and Design Architecture-IC custom design language (schematic capture level). HDL descriptions may also be used for a variety of purposes, including but not limited to layout, behavior, logic and circuit design verification, modeling or simulation.

Where applicable, various embodiments of the invention may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

The foregoing disclosure is not intended to limit the scope of the invention to the precise forms or particular fields of use disclosed. It is contemplated that various alternate embodiments and/or modifications to the invention, whether explicitly described or implied herein, are possible in light of the disclosure.

Having thus described embodiments of the invention, persons of ordinary skill in the art will recognize that changes may be made in form and detail without departing from the scope of the invention. Hence, the invention is limited only by the claims.

What is claimed is:

1. A virtual core management system comprising:
   a physical core;
   a first virtual core including a collection of logical states associated with execution of a first program, the first virtual core being mapped to the physical core;
   a second virtual core including a collection of logical states associated with execution of a second program; and
   a virtual core management component configured to both unmap the first virtual core from the physical core and map the second virtual core to the physical core in response to the virtual core management component detecting that the physical core is idle,
   wherein the virtual core management component is further configured to both unmap the first virtual core from the physical core and map the second virtual core to the physical core in response to the virtual core management component detecting that the physical core is to executing an instruction in the first program that will cause the physical core to be idle for a time period exceeding a threshold, the instruction comprises an instruction corresponding to an input request or an output request that requires an acknowledgement by an input device or output device.

2. The virtual core management system of claim 1, wherein the virtual core management component is further configured to map the second virtual core to the physical core in response to the virtual core management component also detecting that the second virtual core is ready to begin executing the second program.

3. The virtual core management system of claim 1:
   wherein the physical core includes registers,
   wherein the virtual core management component is configured to unmap the first virtual core from the physical core by transferring one or more logical states of the first virtual core from the registers of the physical core to a memory external to the physical core, and
   wherein map the second virtual core to the physical core by transferring one or more logical states of the second virtual core into the registers of the physical core.

4. A method adapted for use with a computer processor comprising a physical core, a first virtual core, and a second virtual core, the first virtual core including a collection of logical states associated with execution of a first program, the first virtual core being mapped to the physical core, the second virtual core including a collection of logical states associated with execution of a second program, the method comprising:
   detecting that the physical core is idle;
   unmapping the first virtual core from the physical core and mapping the second virtual core to the physical core in response to detecting that the physical core is idle;
   detecting that the physical core is executing an instruction associated with the first program that will cause the physical core to be idle for a time period exceeding a threshold; and
   unmapping the first virtual core from the physical core and mapping the second virtual core to the physical core in response to detecting that the physical core is executing an instruction associated with the first program that will cause the physical core to be idle for a time period exceeding a threshold, the instruction comprises an instruction corresponding to an input request or an output request that requires an acknowledgement by an input device or output device.

5. The method of claim 4, wherein mapping the second virtual core to the physical core includes mapping the second virtual core to the physical core also in response to detecting that the second virtual core is ready to begin executing the second program.

6. The method of claim 4, wherein:
   the physical core includes registers;
   unmapping the first virtual core from the physical core includes transferring one or more logical states of the first virtual core from the registers of the physical core to a memory external to the physical core; and
   mapping the second virtual core to the physical core includes transferring one or more logical states of the second virtual core into the registers of the physical core.

7. A non-transitory computer readable medium that includes a circuit description of a virtual core management system, wherein the circuit description, when interpreted by a computer, specifies the virtual core management system comprising:
   a physical core;
   a first virtual core including a collection of logical states associated with execution of a first program, the first virtual core being mapped to the physical core;
   a second virtual core including a collection of logical states associated with execution of a second program; and
   a virtual core management component configured to both unmap the first virtual core from the physical core and map the second virtual core to the physical core in response to the virtual core management component detecting that the physical core is idle,
   wherein the virtual core management component is further configured to both unmap the first virtual core from the physical core and map the second virtual core to the physical core in response to the virtual core management component detecting that the physical core is executing an instruction in the first program that will cause the physical core to be idle for a time period exceeding a threshold, the instruction comprises an instruction corresponding to an input request or an output request that requires an acknowledgement by an input device or output device.

8. A virtual core management system comprising:
   a physical core;
   a first virtual core including a collection of logical states associated with execution of a first program, the first virtual core being mapped to the physical core;
   a second virtual core including a collection of logical states associated with execution of a second program;
   means for unmapping the first virtual core from the physical core and mapping the second virtual core to the physical core in response to the virtual core management component detecting that the physical core is idle; and
   means for unmapping the first virtual core from the physical core and mapping the second virtual core to the physical core in response to the virtual core management component detecting that the physical core is executing an instruction in the first program that will cause the physical core to be idle for a time period exceeding a threshold, the instruction comprises an instruction corresponding to an input request or an output request that requires an acknowledgement by an input device or output device.

9. A virtual core management system comprising:
a physical core;
a first virtual core including a collection of logical states associated with execution of a first program, the first virtual core being mapped to the physical core;
a second virtual core including a collection of logical states associated with execution of a second program; and
a virtual core management component configured to both unmap the first virtual core from the physical core and map the second virtual core to the physical core in response to the virtual core management component detecting that the physical core is idle,
wherein the virtual core management component is further configured to both unmap the first virtual core from the physical core and map the second virtual core to the physical core in response to the virtual core management component detecting that the physical core is executing an instruction in the first program that will cause the physical core to be idle for a time period exceeding a threshold, the instruction comprises an instruction corresponding to an input request or an output request that requires an acknowledgement by an input device or output device, and
wherein the collection of logical states includes a persistent micro-architectural state of the physical processor core and a transient micro-architectural state of the physical processor core.

* * * * *